US008682916B2

(12) United States Patent
Wong et al.

(10) Patent No.: US 8,682,916 B2
(45) Date of Patent: Mar. 25, 2014

(54) REMOTE FILE VIRTUALIZATION IN A SWITCHED FILE SYSTEM

(75) Inventors: Thomas K. Wong, Pleasanton, CA (US); Ron S. Vogel, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 1136 days.

(21) Appl. No.: 12/126,129

(22) Filed: May 23, 2008

(65) Prior Publication Data

US 2009/0094252 A1    Apr. 9, 2009

Related U.S. Application Data

(60) Provisional application No. 60/940,104, filed on May 25, 2007, provisional application No. 60/987,161, filed on Nov. 12, 2007, provisional application No. 60/987,165, filed on Nov. 12, 2007, provisional application No. 60/987,170, filed on Nov. 12, 2007.

(51) Int. Cl.
*G06F 7/00* (2006.01)
*G06F 17/30* (2006.01)

(52) U.S. Cl.
USPC .......................................... 707/758; 707/802

(58) Field of Classification Search
USPC ................................. 707/758, 802
See application file for complete search history.

(56) References Cited

U.S. PATENT DOCUMENTS

| | | |
|---|---|---|
| 4,993,030 A | 2/1991 | Krakauer et al. |
| 5,218,695 A | 6/1993 | Noveck et al. |
| 5,303,368 A | 4/1994 | Kotaki |
| 5,473,362 A | 12/1995 | Fitzgerald et al. |
| 5,511,177 A | 4/1996 | Kagimasa et al. |
| 5,537,585 A | 7/1996 | Blickenstaff et al. |
| 5,548,724 A | 8/1996 | Akizawa et al. |
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,623,490 A | 4/1997 | Richter et al. |
| 5,649,194 A | 7/1997 | Miller et al. |
| 5,649,200 A | 7/1997 | Leblang et al. |
| 5,668,943 A | 9/1997 | Attanasio et al. |
| 5,692,180 A | 11/1997 | Lee |
| 5,721,779 A | 2/1998 | Funk |

(Continued)

FOREIGN PATENT DOCUMENTS

| | | |
|---|---|---|
| AU | 2003300350 A1 | 7/2004 |
| CA | 2080530 A1 | 4/1994 |

(Continued)

OTHER PUBLICATIONS

Sorenson, K. M.: Installation and Administration, Kimberlite Cluster Version 1.1.0, revision D, Dec. 2000.*

(Continued)

*Primary Examiner* — Kuen Lu
(74) *Attorney, Agent, or Firm* — LeClairRyan, a Professional Corporation

(57) ABSTRACT

A plurality of network file manager switches interoperate to provide remote file virtualization. Copies of file data and/or metadata are maintained at a central site and at one or more remote sites. The network file manager switch at the remote site may satisfy certain client requests locally without having to contact the network file manager switch at the central site. A global namespace is maintained and is communicated to all network file manager switches.

30 Claims, 16 Drawing Sheets

(56) References Cited

U.S. PATENT DOCUMENTS

| | | |
|---|---|---|
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,926,816 A | 7/1999 | Bauer et al. |
| 5,937,406 A | 8/1999 | Balabine et al. |
| 5,991,302 A | 11/1999 | Berl et al. |
| 5,995,491 A | 11/1999 | Richter et al. |
| 5,999,664 A | 12/1999 | Mahoney et al. |
| 6,012,083 A | 1/2000 | Savitsky et al. |
| 6,029,168 A | 2/2000 | Frey |
| 6,044,367 A | 3/2000 | Wolff |
| 6,047,129 A | 4/2000 | Frye |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,104,706 A | 8/2000 | Richter et al. |
| 6,128,627 A | 10/2000 | Mattis et al. |
| 6,128,717 A | 10/2000 | Harrison et al. |
| 6,161,145 A | 12/2000 | Bainbridge et al. |
| 6,161,185 A | 12/2000 | Guthrie et al. |
| 6,181,336 B1 | 1/2001 | Chiu et al. |
| 6,202,156 B1 | 3/2001 | Kalajan |
| 6,223,206 B1 | 4/2001 | Dan et al. |
| 6,233,648 B1 | 5/2001 | Tomita |
| 6,237,008 B1 | 5/2001 | Beal et al. |
| 6,256,031 B1 | 7/2001 | Meijer et al. |
| 6,282,610 B1 | 8/2001 | Bergsten |
| 6,289,345 B1 | 9/2001 | Yasue |
| 6,308,162 B1 | 10/2001 | Ouimet et al. |
| 6,324,581 B1 | 11/2001 | Xu et al. |
| 6,329,985 B1 | 12/2001 | Tamer et al. |
| 6,339,785 B1 | 1/2002 | Feigenbaum |
| 6,349,343 B1 | 2/2002 | Foody et al. |
| 6,374,263 B1 | 4/2002 | Bunger et al. |
| 6,389,433 B1 | 5/2002 | Bolosky et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,516,350 B1 | 2/2003 | Lumelsky et al. |
| 6,516,351 B2 | 2/2003 | Borr |
| 6,542,909 B1 | 4/2003 | Tamer et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,601,101 B1 | 7/2003 | Lee et al. |
| 6,606,663 B1 | 8/2003 | Liao et al. |
| 6,612,490 B1 | 9/2003 | Herrendoerfer et al. |
| 6,654,346 B1 | 11/2003 | Mahalingaiah et al. |
| 6,721,794 B2 | 4/2004 | Taylor et al. |
| 6,728,265 B1 | 4/2004 | Yavatkar et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,744,776 B1 | 6/2004 | Kalkunte et al. |
| 6,748,420 B1 | 6/2004 | Quatrano et al. |
| 6,754,215 B1 | 6/2004 | Arikawa et al. |
| 6,757,706 B1 | 6/2004 | Dong et al. |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,782,450 B2 | 8/2004 | Arnott et al. |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,868,439 B2 | 3/2005 | Basu et al. |
| 6,871,245 B2 | 3/2005 | Bradley |
| 6,880,017 B1 | 4/2005 | Marce et al. |
| 6,889,249 B2 | 5/2005 | Miloushev et al. |
| 6,914,881 B1 | 7/2005 | Mansfield et al. |
| 6,922,688 B1 | 7/2005 | Frey, Jr. |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,973,455 B1 | 12/2005 | Vahalia et al. |
| 6,973,549 B1 | 12/2005 | Testardi |
| 6,975,592 B1 | 12/2005 | Seddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 7,003,533 B2 | 2/2006 | Noguchi et al. |
| 7,006,981 B2 | 2/2006 | Rose et al. |
| 7,010,553 B2 | 3/2006 | Chen et al. |
| 7,013,379 B1 | 3/2006 | Testardi |
| 7,020,644 B2 | 3/2006 | Jameson |
| 7,020,669 B2 | 3/2006 | McCann et al. |
| 7,039,061 B2 | 5/2006 | Connor et al. |
| 7,051,112 B2 | 5/2006 | Dawson |
| 7,054,998 B2 | 5/2006 | Arnott et al. |
| 7,072,917 B2 | 7/2006 | Wong et al. |
| 7,075,924 B2 | 7/2006 | Richter et al. |
| 7,089,286 B1 | 8/2006 | Malik |
| 7,111,115 B2 | 9/2006 | Peters et al. |
| 7,113,962 B1 | 9/2006 | Kee et al. |
| 7,120,728 B2 | 10/2006 | Krakirian et al. |
| 7,120,746 B2 | 10/2006 | Campbell et al. |
| 7,127,556 B2 | 10/2006 | Blumenau et al. |
| 7,133,967 B2 | 11/2006 | Fujie et al. |
| 7,143,146 B2 | 11/2006 | Nakatani et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,173,929 B1 | 2/2007 | Testardi |
| 7,194,579 B2 | 3/2007 | Robinson et al. |
| 7,234,074 B2 | 6/2007 | Cohn et al. |
| 7,236,491 B2 | 6/2007 | Tsao et al. |
| 7,280,536 B2 | 10/2007 | Testardi |
| 7,284,150 B2 | 10/2007 | Ma et al. |
| 7,293,097 B2 | 11/2007 | Borr |
| 7,293,099 B1 | 11/2007 | Kalajan |
| 7,293,133 B1 | 11/2007 | Colgrove et al. |
| 7,308,475 B1 | 12/2007 | Pruitt et al. |
| 7,343,398 B1 | 3/2008 | Lownsbrough |
| 7,346,664 B2 | 3/2008 | Wong et al. |
| 7,383,288 B2 | 6/2008 | Miloushev et al. |
| 7,401,220 B2 | 7/2008 | Bolosky et al. |
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,440,982 B2 | 10/2008 | Lu et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Sasaki et al. |
| 7,509,322 B2 | 3/2009 | Miloushev et al. |
| 7,512,673 B2 | 3/2009 | Miloushev et al. |

(56) References Cited

U.S. PATENT DOCUMENTS

| | | |
|---|---|---|
| 7,519,813 B1 | 4/2009 | Cox et al. |
| 7,562,110 B2 | 7/2009 | Miloushev et al. |
| 7,571,168 B2 | 8/2009 | Bahar et al. |
| 7,574,443 B2 | 8/2009 | Bahar et al. |
| 7,587,471 B2 | 9/2009 | Yasuda et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,624,109 B2 | 11/2009 | Testardi |
| 7,639,883 B2 | 12/2009 | Gill |
| 7,644,109 B2 | 1/2010 | Manley et al. |
| 7,653,699 B1 | 1/2010 | Colgrove et al. |
| 7,656,788 B2 | 2/2010 | Ma et al. |
| 7,685,177 B1 | 3/2010 | Hagerstrom et al. |
| 7,689,596 B2 | 3/2010 | Tsunoda |
| 7,694,082 B2 | 4/2010 | Golding et al. |
| 7,711,771 B2 | 5/2010 | Kirnos |
| 7,734,603 B1 | 6/2010 | McManis |
| 7,743,035 B2 | 6/2010 | Chen et al. |
| 7,752,294 B2 | 7/2010 | Meyer et al. |
| 7,769,711 B2 | 8/2010 | Srinivasan et al. |
| 7,788,335 B2 | 8/2010 | Miloushev et al. |
| 7,809,691 B1 | 10/2010 | Karmarkar et al. |
| 7,818,299 B1 | 10/2010 | Federwisch et al. |
| 7,822,939 B1 | 10/2010 | Veprinsky et al. |
| 7,831,639 B1 | 11/2010 | Panchbudhe et al. |
| 7,849,112 B2 | 12/2010 | Mane et al. |
| 7,853,958 B2 | 12/2010 | Mathew et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,903,554 B1 | 3/2011 | Manur et al. |
| 7,904,466 B1 | 3/2011 | Valencia et al. |
| 7,913,053 B1 | 3/2011 | Newland |
| 7,953,085 B2 | 5/2011 | Chang et al. |
| 7,953,701 B2 | 5/2011 | Okitsu et al. |
| 7,958,347 B1 | 6/2011 | Ferguson |
| 7,984,108 B2 | 7/2011 | Landis et al. |
| 8,005,953 B2 | 8/2011 | Miloushev et al. |
| 8,046,547 B1 | 10/2011 | Chatterjee et al. |
| 8,103,622 B1 | 1/2012 | Karinta |
| 8,112,392 B1 | 2/2012 | Bunnell et al. |
| 8,171,124 B2 | 5/2012 | Kondamuru |
| 8,209,403 B2 | 6/2012 | Szabo et al. |
| 8,271,751 B2 | 9/2012 | Hinrichs, Jr. |
| 8,326,798 B1 | 12/2012 | Driscoll et al. |
| 8,351,600 B2 | 1/2013 | Resch |
| 2001/0007560 A1 | 7/2001 | Masuda et al. |
| 2001/0014891 A1 | 8/2001 | Hoffert et al. |
| 2001/0047293 A1 | 11/2001 | Waller et al. |
| 2001/0051955 A1 | 12/2001 | Wong |
| 2002/0035537 A1 | 3/2002 | Waller et al. |
| 2002/0059263 A1 | 5/2002 | Shima et al. |
| 2002/0065810 A1 | 5/2002 | Bradley |
| 2002/0073105 A1 | 6/2002 | Noguchi et al. |
| 2002/0083118 A1 | 6/2002 | Sim |
| 2002/0087887 A1 | 7/2002 | Busam et al. |
| 2002/0106263 A1 | 8/2002 | Winker |
| 2002/0120763 A1 | 8/2002 | Miloushev et al. |
| 2002/0133330 A1 | 9/2002 | Loisey et al. |
| 2002/0133491 A1 | 9/2002 | Sim et al. |
| 2002/0138502 A1 | 9/2002 | Gupta |
| 2002/0143909 A1 | 10/2002 | Botz et al. |
| 2002/0147630 A1 | 10/2002 | Rose et al. |
| 2002/0150253 A1 | 10/2002 | Brezak et al. |
| 2002/0156905 A1 | 10/2002 | Weissman |
| 2002/0161911 A1 | 10/2002 | Pinckney, III et al. |
| 2002/0188667 A1 | 12/2002 | Kimos |
| 2002/0194342 A1 | 12/2002 | Lu et al. |
| 2003/0009429 A1 | 1/2003 | Jameson |
| 2003/0012382 A1 | 1/2003 | Ferchichi et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0061240 A1* | 3/2003 | McCann et al. .............. 707/200 |
| 2003/0065956 A1 | 4/2003 | Belapurkar et al. |
| 2003/0115218 A1 | 6/2003 | Bobbitt et al. |
| 2003/0115439 A1 | 6/2003 | Mahalingam et al. |
| 2003/0128708 A1 | 7/2003 | Inoue et al. |
| 2003/0135514 A1 | 7/2003 | Patel et al. |
| 2003/0149781 A1 | 8/2003 | Yared et al. |
| 2003/0156586 A1 | 8/2003 | Lee et al. |
| 2003/0159072 A1 | 8/2003 | Bellinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0200207 A1 | 10/2003 | Dickinson |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0017825 A1 | 1/2004 | Stanwood et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030857 A1 | 2/2004 | Krakirian et al. |
| 2004/0044705 A1 | 3/2004 | Stager et al. |
| 2004/0054748 A1 | 3/2004 | Ackaouy et al. |
| 2004/0054777 A1 | 3/2004 | Ackaouy et al. |
| 2004/0098383 A1 | 5/2004 | Tabellion et al. |
| 2004/0098595 A1 | 5/2004 | Aupperle et al. |
| 2004/0133573 A1 | 7/2004 | Miloushev et al. |
| 2004/0133577 A1 | 7/2004 | Miloushev et al. |
| 2004/0133606 A1 | 7/2004 | Miloushev et al. |
| 2004/0133607 A1 | 7/2004 | Miloushev et al. |
| 2004/0133652 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0181605 A1 | 9/2004 | Nakatani et al. |
| 2004/0199547 A1 | 10/2004 | Winter et al. |
| 2004/0213156 A1 | 10/2004 | Smallwood et al. |
| 2004/0236798 A1 | 11/2004 | Srinivasan et al. |
| 2004/0267830 A1 | 12/2004 | Wong et al. |
| 2005/0021615 A1 | 1/2005 | Arnott et al. |
| 2005/0027862 A1 | 2/2005 | Nguyen et al. |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0114701 A1 | 5/2005 | Atkins et al. |
| 2005/0117589 A1 | 6/2005 | Douady et al. |
| 2005/0160161 A1 | 7/2005 | Barrett et al. |
| 2005/0175013 A1 | 8/2005 | Le Pennec et al. |
| 2005/0187866 A1 | 8/2005 | Lee |
| 2005/0198501 A1 | 9/2005 | Andreev et al. |
| 2005/0213587 A1 | 9/2005 | Cho et al. |
| 2005/0246393 A1 | 11/2005 | Coates et al. |
| 2005/0289109 A1 | 12/2005 | Arrouye et al. |
| 2005/0289111 A1 | 12/2005 | Tribble et al. |
| 2006/0010502 A1 | 1/2006 | Mimatsu et al. |
| 2006/0045096 A1 | 3/2006 | Farmer et al. |
| 2006/0074922 A1 | 4/2006 | Nishimura |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0123062 A1 | 6/2006 | Bobbitt et al. |
| 2006/0140193 A1 | 6/2006 | Kakani et al. |
| 2006/0153201 A1 | 7/2006 | Hepper et al. |
| 2006/0161518 A1 | 7/2006 | Lacapra |
| 2006/0167838 A1 | 7/2006 | Lacapra |
| 2006/0184589 A1 | 8/2006 | Lees et al. |
| 2006/0190496 A1* | 8/2006 | Tsunoda ...................... 707/200 |
| 2006/0200470 A1 | 9/2006 | Lacapra et al. |
| 2006/0206547 A1 | 9/2006 | Kulkarni et al. |
| 2006/0212746 A1 | 9/2006 | Amegadzie et al. |
| 2006/0218135 A1 | 9/2006 | Bisson et al. |
| 2006/0224636 A1 | 10/2006 | Kathuria et al. |
| 2006/0224687 A1 | 10/2006 | Popkin et al. |
| 2006/0230265 A1 | 10/2006 | Krishna |
| 2006/0259949 A1* | 11/2006 | Schaefer et al. ................ 726/1 |

(56) References Cited

U.S. PATENT DOCUMENTS

| | | |
|---|---|---|
| 2006/0268692 A1 | 11/2006 | Wright et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0282461 A1 | 12/2006 | Marinescu |
| 2006/0282471 A1 | 12/2006 | Mark et al. |
| 2007/0022121 A1 | 1/2007 | Bahar et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0061441 A1 | 3/2007 | Landis et al. |
| 2007/0088702 A1 | 4/2007 | Fridella et al. |
| 2007/0098284 A1 | 5/2007 | Sasaki et al. |
| 2007/0136308 A1 | 6/2007 | Tsirigotis et al. |
| 2007/0139227 A1 | 6/2007 | Speirs, II et al. |
| 2007/0180314 A1 | 8/2007 | Kawashima et al. |
| 2007/0208748 A1 | 9/2007 | Li |
| 2007/0209075 A1 | 9/2007 | Coffman |
| 2007/0226331 A1 | 9/2007 | Srinivasan et al. |
| 2008/0046432 A1 | 2/2008 | Anderson et al. |
| 2008/0070575 A1 | 3/2008 | Claussen et al. |
| 2008/0104443 A1 | 5/2008 | Akutsu et al. |
| 2008/0114718 A1 | 5/2008 | Anderson et al. |
| 2008/0189468 A1 | 8/2008 | Schmidt et al. |
| 2008/0200207 A1 | 8/2008 | Donahue et al. |
| 2008/0208933 A1 | 8/2008 | Lyon |
| 2008/0209073 A1 | 8/2008 | Tang |
| 2008/0215836 A1 | 9/2008 | Sutoh et al. |
| 2008/0222223 A1 | 9/2008 | Srinivasan et al. |
| 2008/0243769 A1 | 10/2008 | Arbour et al. |
| 2008/0263401 A1 | 10/2008 | Stenzel |
| 2008/0282047 A1 | 11/2008 | Arakawa et al. |
| 2008/0294446 A1 | 11/2008 | Guo et al. |
| 2009/0007162 A1 | 1/2009 | Sheehan |
| 2009/0013138 A1 | 1/2009 | Sudhakar |
| 2009/0019535 A1 | 1/2009 | Mishra et al. |
| 2009/0037975 A1 | 2/2009 | Ishikawa et al. |
| 2009/0041230 A1 | 2/2009 | Williams |
| 2009/0055507 A1 | 2/2009 | Oeda |
| 2009/0055607 A1 | 2/2009 | Schack et al. |
| 2009/0077097 A1 | 3/2009 | Lacapra et al. |
| 2009/0089344 A1 | 4/2009 | Brown et al. |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0132616 A1 | 5/2009 | Winter et al. |
| 2009/0161542 A1 | 6/2009 | Ho |
| 2009/0187915 A1 | 7/2009 | Chew et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0210875 A1 | 8/2009 | Bolles et al. |
| 2009/0240705 A1 | 9/2009 | Miloushev et al. |
| 2009/0240899 A1 | 9/2009 | Akagawa et al. |
| 2009/0254592 A1 | 10/2009 | Marinov et al. |
| 2009/0265396 A1 | 10/2009 | Ram et al. |
| 2010/0017643 A1 | 1/2010 | Baba et al. |
| 2010/0061232 A1 | 3/2010 | Zhou et al. |
| 2010/0082542 A1 | 4/2010 | Feng et al. |
| 2010/0205206 A1 | 8/2010 | Rabines et al. |
| 2010/0325257 A1 | 12/2010 | Goel et al. |
| 2010/0325634 A1 | 12/2010 | Ichikawa et al. |
| 2011/0083185 A1 | 4/2011 | Sheleheda et al. |
| 2011/0093471 A1 | 4/2011 | Brockway et al. |
| 2011/0107112 A1 | 5/2011 | Resch |
| 2011/0119234 A1 | 5/2011 | Schack et al. |
| 2011/0296411 A1 | 12/2011 | Tang et al. |
| 2011/0320882 A1 | 12/2011 | Beaty et al. |
| 2012/0144229 A1 | 6/2012 | Nadolski |
| 2012/0150699 A1 | 6/2012 | Trapp et al. |
| 2013/0007239 A1 | 1/2013 | Agarwal et al. |
| 2013/0058252 A1 | 3/2013 | Casado et al. |
| 2013/0058255 A1 | 3/2013 | Casado et al. |

FOREIGN PATENT DOCUMENTS

| | | |
|---|---|---|
| CA | 2512312 A1 | 7/2004 |
| EP | 0605088 A3 | 2/1996 |
| EP | 0 738 970 A | 10/1996 |
| JP | 63010250 A | 1/1988 |
| JP | 6205006 A | 7/1994 |
| JP | 6-332782 A | 12/1994 |
| JP | 8021924 B | 3/1996 |
| JP | 08-328760 A | 12/1996 |
| JP | 08-339355 | 12/1996 |
| JP | 9016510 A | 1/1997 |
| JP | 11282741 A1 | 10/1999 |
| JP | 2000-183935 | 6/2000 |
| NZ | 566291 A | 12/2008 |
| WO | 02/39696 A2 | 5/2002 |
| WO | WO 02/056181 A | 7/2002 |
| WO | WO 02/056181 A3 | 7/2002 |
| WO | WO 2004/061605 A2 | 7/2004 |
| WO | 2006091040 A1 | 8/2006 |
| WO | WO 2008/130983 A1 | 10/2008 |
| WO | WO 2008/147973 A2 | 12/2008 |

OTHER PUBLICATIONS

International Search Report for International Patent Application No. PCT/US2008/064677 (Jun. 6, 2009).

"Auspex Storage Architecture Guide," Second Edition, 2001, Auspex Systems, Inc., www.ausoex.com, last accessed on Dec. 30, 2002.

"CSA Persistent File System Technology, Colorado Software" Architecture, Inc. White Paper, Jan. 1999, p. 1-3.

"Distributed File System: A Logical View of Physical Storage : White Paper," 1999, Microsoft Corp., www.microsoft.com, last accessed on Dec. 20, 2002.

"How DFS Works: Remote File Systems," Distributed File System (DFS) Technical Reference, retrieved from the Internet on Feb. 13, 2009: URL:http: / /technetmicrosoft.com/en-us/library/cc782417.aspx>(2003).

"NERSC Tutorials: I/O on the Cray T3E," chapter 8, "Disk Striping," National Energy Research Scientific Computing Center (NERSC), http:/ /hpcf.nersc.gov, last accessed on Dec. 27, 2002.

"Scaling Next Generation Web Infrastructure with Content-Intelligent Switching : White Paper," Apr. 2000, Alteon WebSystems, Inc., (now Nortel Networks).

"The AFS File System in Distributed Computing Environment," May 1996, Transarc Corp., www.transarc.ibm.com, last accessed on Dec. 20, 2002.

"VERITAS SANPoint Foundation Suite(tm) and SANPoint Foundation(trn) Suite HA: New VERITAS Volume Management and File System Technology for Cluster Environments," Sep. 2001, VERITAS Software Corp.

"Windows Clustering Technologies—An Overview," Nov. 2000, Microsoft Corp., www.microsoft.com, last accessed on Dec. 30, 2002.

Aguilera et al., "Improving recoverability in multi-tier storage systems," International Conference on Dependable Systems and Networks (DSN-2007), Edinburgh, Scotland, Jun. 2007, 10 pages.

Anderson et al., "Serverless Network File System," in the 15th Symposium on Operating Systems Principles, Dec. 1995, Association for Computing Machinery, Inc.

Anderson, Darrell C. et al., "Interposed Request Routing for Scalable Network Storage," ACM Transactions on Computer Systems 20(1):1-24 (Feb. 2002).

Apple, Inc. "Mac OS X Tiger Keynote Intro. Part 2" Jun. 2004, www.youtube.com <http://www.youtube.com/watch?v=zSBJwEmRJbY>, p. 1.

Apple, Inc. "Tiger Developer Overview Series: Working with Spotlight" Nov. 23, 2004, www.apple.com using www.archive.org <http://web.archive.org/web/20041123005335/developer.apple.com/macosx/tiger/spotlight.html>, pp. 1-11.

Cabrera et al., "Swift: A Storage Architecture for Large Objects," Proceedings of the Eleventh IEEE Symposium on Mass Storage Systems, pp. 123-428, Oct. 1991.

(56) References Cited

OTHER PUBLICATIONS

Cabrera et al., "Swift: Using Distributed Disk Striping to Provide High I/O Data Rates," Computing Systems 4, 4 (Fall 1991), pp. 405-436.
Cabrera et al, "Using Data Striping in a Local Area Network," 1992, technical report No. UCSC-CRL-92-09 of the Computer & Information Sciences Department of University of California at Santa Cruz.
Callaghan et al., "NFS Version 3 Protocol Spcification," (RFC 1813), 1995, The Internet Engineering Task Force (IETF), www.ietf.org, last accessed on Dec. 30, 2002.
Carns et al., "PVFS: A Parallel File System for Linux Clusters," Proceedings of the 4th Annual Linux Showcase and Conference, pp. 317-327, Atlanta, Georgia, Oct. 2000, USENIX Association.
Cavale, M. R., "Introducing Microsoft Cluster Service (MSCS) in the Windows Server 2003," Microsoft Corporation, Nov. 2002.
English Translation of Notification of Reason(s) for Refusal for JP 2002-556371 (Dispatch Date: Jan. 22, 2007).
Fan, et al., "Summary Cache: A Scalable Wide—Area Web Cache Sharing Protocol,"Computer Communications Review, Association for Computing Machinery, New York, USA 28(4):254-265 (1998).
Book Review, by Enterprise Storage Forum Staff, of "Building Storage Networks," by M. Farley, Jan. 2000, McGraw-Hill, ISBN 0072120509.
Gibson et al., "File Server Scaling with Network-Attached Secure Disks," in Proceedings of the ACM International Conference on Measurement and Modeling of Computer Systems (Sigmetrics '97), 1997, Association for Computing Machinery, Inc.
Gibson et al., "NASD Scalable Storage Systems," Jun. 1999, USENIX99, Extreme Linux Workshop, Monterey, California.
Hartman, "The Zebra Striped Network File System," 1994, Ph.D. dissertation submitted in the Graduate Division of the University of California at Berkeley.
Haskin et al., "The Tiger Shark File System," 1995, in proceedings of IEEE, Spring COMPCON, Santa Clara, CA, www.research.ibm.com, last accessed on Dec. 30, 2002.
Hwang et al., Designing SSI Clusters with Hierarchical Checkpointing and Single I/O Space, IEEE Concurrency, pp. 60-69, Jan.-Mar. 1999.
International Search Report for International Patent Application No. PCT/US03/41202 (Sep. 15, 2005).
International Search Report for International Patent Application No. PCT/US02/00720 (Jul. 8, 2004).
International Search Report for International Patent Application No. PCT/US2008/060449 (Apr. 9, 2008).
International Search Report for International Patent Application No. PCT/US2008/083117 (Jun. 23, 2009).
Karamanolis et al., "An Architecture for Scalable and Manageable File Services," HPL-2001-173 p. 1-14 (Jul. 26, 2001).
Katsurashima et al., "NAS Switch: A Novel CIFS Server Virtualization," Proceedings. 20th IEEE/11th NASA Goddard Conference on Mass Storage Systems and Technologies, 2003 (MSST 2003), Apr. 2003.
Kimball, C.E. et al., Automated Client-Side Integration of Distributed Application Servers, 13th LISA Conf., 1999. (no month, day).
Kohl et al., "The Kerberos Network Authentication Service (V5)," RFC 1510, Sep. 1993. (http://www.ietf.org/rfc/rfc1510.txt?number=1510.
Long et al., "Swift/RAID: A distributed RAID system," Computing Systems, vol. 7, pp. 1-20, Summer 1994.
Noghani et al.,"A Novel Approach to reduce Latency on the Internet: 'Component-Based Download'," Proceedings of the Int'l Conf. on Internet Computing, Las Vegas, NV pp. 1-6 (2000).
Norton et al., "CIFS Protocol Version CIFS-Spec 0.9," 2001, Storage Networking Industry Association (SNIA), www.snia.org, last accessed on Mar. 26, 2001.
Patterson et al., "A case for redundant arrays of inexpensive disks (RAID)," Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Pearson, P.K., "Fast Hashing of Variable-Length Text Strings," Comm. of the ACM, vol. 33, No. 6, Jun. 1990.
Peterson, "Introducing Storage Area Networks," Feb. 1998, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, www.usenix.org, last accessed on Dec. 20, 2002.
U.S. Appl. No. 60/702,428, filed Jul. 25, 2005.
U.S. Appl. No. 60/702,429, filed Jul. 25, 2005.
Rodriguez et al., "Parallel-access for Mirror Sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph-p. 868, col. 1, paragraph 1.
Savage, et al., "AFRAID—A Frequently Redundant Array of Inexpensive Disks," 1996 USENIX Technical Conf., San Diego, California, Jan. 22-26, 1996.
Soltis et al., The Design and Performance of Shared Disk File System for IRIX, 6th NASA Goddard Space Flight Center Conf. on Mass Storage & Technologies, IEEE Symposium on Mass Storage Systems, p. 1-17 (Mar. 1998).
Sorenson, K.M., "Installation and Administration: Kimberlite Cluster Version 1.1.0, Rev. D." Mission Critical Linux, (no year, month, day) http:/ /oss.missioncriticallinux.com/kimberlite/kimberlite.pdf.
Stakutis, "Benefits of SAN-based file system sharing," Jul. 2000, InfoStor, www.infostor.com, last accessed on Dec. 30, 2002.
Thekkath et al., "Frangipani: A Scalable Distributed File System," in Proceedings of the 16th ACM Symposium on Operating Systems Principles, Oct. 1997, Association for Computing Machinery, Inc.
Wilkes, J., et al., "The HP AutoRAID Hierarchical Storage System," ACM Transactions on Computer Systems, vol. 14, No. 1, Feb. 1996.
Zayas, "AFS-3 Programmer's Reference: Architectural Overview," Transarc Corp., version 1.0 of Sep. 2, 1991, doc. No. FS-00-D160.
"Welcome to the RSYNC Web Pages," Retrieved from the Internet URL: http:/ /samba.anu.edu.au/rsync/ (Retrieved on Dec. 18, 2009).
English Language Abstract of JP 08-328760 from Patent Abstracts of Japan.
English Language Abstract of JP 08-339355 from Patent Abstracts of Japan.
English Translation of paragraphs 17, 32, and 40-52 of JP 08-328760.
Harrison, C., May 19, 2008 response to Communication pursuant to Article 96(2) EPC dated Nov. 9, 2007 in corresponding European patent application No. 02718824.2.
Hu, J., Final Office action dated Sep. 21, 2007 for related U.S. Appl. No. 10/336,784.
Hu, J., Office action dated Feb. 6, 2007 for related U.S. Appl. No. 10/336,784.
International Search Report for International Patent Application No. PCT/US2008/064677 (Sep. 6, 2009).
Klayman, J., Nov. 13, 2008 e-mail to Japanese associate including instructions for response to office action dated May 26, 2008 in corresponding Japanese patent application No. 2002-556371.
Klayman, J., Response filed by Japanese associate to office action dated Jan. 22, 2007 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Klayman, J., Response filed Mar. 20, 2008 to Final Office action dated Sep. 21, 2007 for related U.S. Appl. No. 10/336,784.
Korkuzas, V., Communication pursuant to Article 96(2) EPC dated Sep. 11, 2007 in corresponding European patent application No. 02718824.2-2201.
Lelil, S., "Storage Technology News: AutoVirt adds tool to help data migration projects", Feb. 25, 2011, last accessed Mar. 17, 2011, <http://searchstorage.techtarget.com/news/article/0,289142,sid5__gci1527986,00.html>.
Saunders, S., Response filed Jul. 6, 2007 to Office action dated Feb. 6, 2007 for related U.S. Appl. No. 10/336,784.

(56) References Cited

OTHER PUBLICATIONS

Soltis, et al., The Global File System, in Proceedings of the Fifth NASA Goddard Space Flight Center Conference on Mass Storage Systems and Technologies, Sep. 17-19, 1996, College Park, Maryland.
Uesugi, H., Nov. 26, 2008 amendment filed by Japanese associate in response to office action dated May 26, 2008 in corresponding Japanese patent application No. 2002-556371.
Uesugi, H., English translation of office action dated May 26, 2008 in corresponding Japanese patent application No. 2002-556371.
Uesugi, H., Jul. 15, 2008 letter from Japanese associate reporting office action dated May 26, 2008 in corresponding Japanese patent application No. 2002-556371.
Gupta et al., "Algorithms for Packet Classification", Computer Systems Laboratory, Stanford University, CA, Mar./Apr. 2001, pp. 1-29.
Heinz II G., "Priorities in Stream Transmission Control Protocol (SCTP) Multistreaming", Thesis submitted to the Faculty of the University of Delaware, Spring 2003, pp. 1-35.
Internet Protocol,"DARPA Internet Program Protocol Specification", (RFC:791), Information Sciences Institute, University of Southern California, Sep. 1981, pp. 1-49.
Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.
Modiano E., "Scheduling Algorithms for Message Transmission Over a Satellite Broadcast System," MIT Lincoln Laboratory Advanced Network Group, Nov. 1997, pp. 1-7.
Ott D., et al., "A Mechanism for TCP-Friendly Transport-level Protocol Coordination", USENIX Annual Technical Conference, 2002, University of North Carolina at Chapel Hill, pp. 1-12.
Padmanabhan V., et al., "Using Predictive Prefetching to Improve World Wide Web Latency", SIGCOM, 1996, pp. 1-15.
Rosen E., et al., "MPLS Label Stack Encoding", (RFC:3032) Network Working Group, Jan. 2001, pp. 1-22, (http://www.ietf.org/rfc/rfc3032.txt).
Wang B., "Priority and Realtime Data Transfer Over the Best-Effort Internet", Dissertation Abstract, Sep. 2005, ScholarWorks@UMASS.
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).
Basney, Jim et al., "Credential Wallets: A Classification of Credential Repositories Highlighting MyProxy," TPRC 2003, Sep. 19-21, 2003.
Botzum Keys, "Single Sign On—A Contrarian View," Open Group Website, <http://www.opengroup.org/security/topics.htm>, Aug. 6, 2001, pp. 1-8.
Novotny, Jason et al., "An Online Credential Repository for the Grid: MyProxy," 2001, pp. 1-8.
Pashalidis, Andreas et al., "A Taxonomy of Single Sign-On Systems," 2003, pp. 1-16, Royal Holloway, University of London, Egham Surray, TW20, 0EX, United Kingdom.
Pashalidis, Andreas et al., "Impostor: a single sign-on system for use from untrusted devices," Global Telecommunications Conference, 2004, GLOBECOM '04, IEEE, Issue Date: Nov. 29-Dec. 3, 2004. Royal Holloway, University of London.
Tulloch, Mitch, "Microsoft Encyclopedia of Security," pp. 218, 300-301, Microsoft Press, 2003, Redmond, Washington.

\* cited by examiner

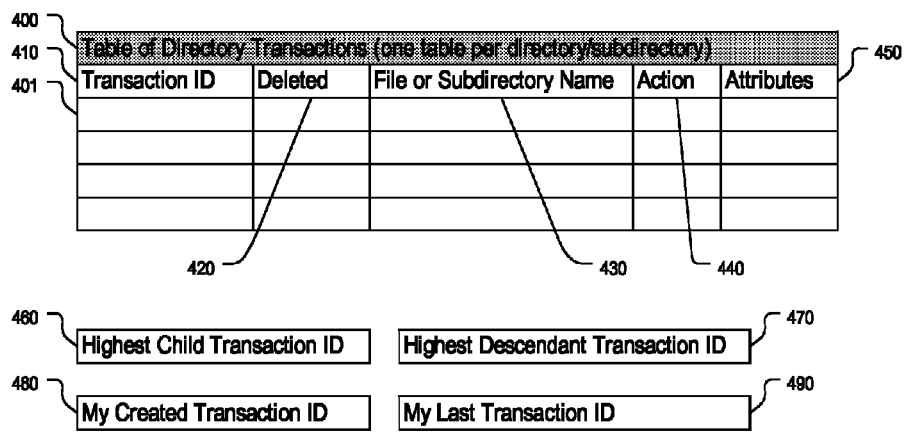
FIG. 6
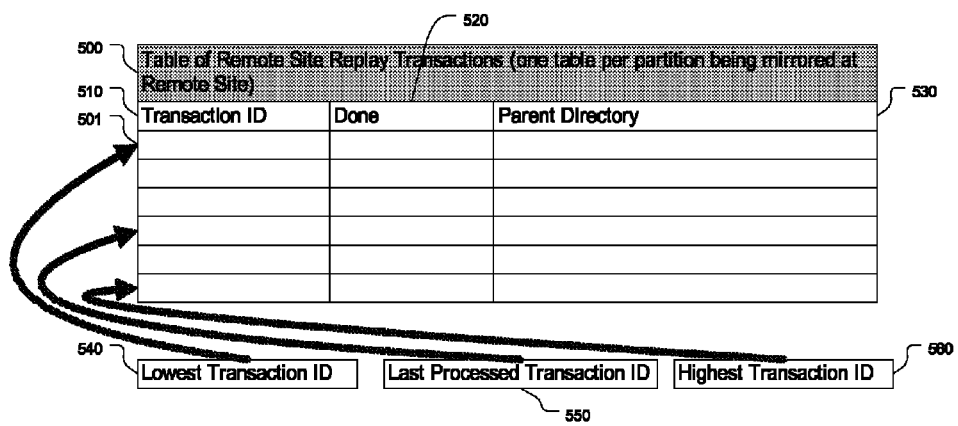
FIG. 7
Remote: My Last Transaction ID (one per directory being mirrored at remote site) — 600
FIG. 8

REMOTE FILE VIRTUALIZATION IN A SWITCHED FILE SYSTEM

CROSS-REFERENCE TO RELATED APPLICATION

This application claims priority from the following United States Provisional patent applications, each of which is hereby incorporated herein by reference in its entirety:

U.S. Provisional Patent Application No. 60/940,104 entitled REMOTE FILE VIRTUALIZATION filed on May 25, 2007;

U.S. Provisional Patent Application No. 60/987,161 entitled REMOTE FILE VIRTUALIZATION METADATA MIRRORING filed on Nov. 12, 2007;

U.S. Provisional Patent Application No. 60/987,165 entitled REMOTE FILE VIRTUALIZATION DATA MIRRORING filed on Nov. 12, 2007; and U.S. Provisional Patent Application No. 60/987,170 entitled REMOTE FILE VIRTUALIZATION WITH NO EDGE SERVERS filed on Nov. 12, 2007.

FIELD OF THE INVENTION

This invention relates generally to switched file systems, and, more specifically, to remote file virtualization in a switched file system.

BACKGROUND OF THE INVENTION

In a computer network, NAS (Network Attached Storage) file servers provide file services for clients connected in a computer network using the NAS protocols such as NFS or CIFS. Historically, clients and file servers are usually located in the same geographical location and are connected in a local area computer network (LAN). LAN usually has high network bandwidth and low network latency.

In today's information age, however, clients and file servers are often located across a wide geographical area and communicate over a wide area network (WAN) such as the Internet. WANs usually have low network bandwidth and high network latency, compared to LANs. Furthermore, NAS protocols, particularly CIFS, are often "chatty" and require many messages between a client and a file server in order to retrieve the contents of an entire file. The chattiness of the CIFS protocol exacerbates the latency problem that often makes accessing remote files impractical and intolerable.

One common approach to accelerate remote file access across a WAN is to use a data compression technique to reduce the size or number of messages being sent across the WAN. This solution is often referred to as WAN optimization. Under WAN optimization, two optimization appliances are used, one located at the central site (i.e., near the file servers), and another located at a remote site (i.e., near the clients). The optimization appliance at the sending site does the message compression before the message is sent, and the optimization appliance located at the receiving site reconstructs the original message from the compressed message it received. The users or the applications at a remote site are completely unaware of this compression/decompression activity. As a result, the usage of WAN network bandwidth and corresponding network latency is reduced. WAN optimization is discussed in Robb, Drew; *Remote Management: WAFS, WAN Optimizes or Wait?*, http://www.enterprisestorageforum.com/technology/features/article.php/3511221, Jun. 8, 2005, which is hereby incorporated herein by reference in its entirety.

Another common approach to accelerate remote file access across a WAN is to cache file data at the remote site and service (terminate) file requests at the remote site using the cached data if possible. In this way, certain client/server communications over the WAN can be avoided. Thus, if a file that was cached at the remote site is accessed by a user at the remote site, file requests for the cached file become much faster than usual because a local file access is substantially faster than a remote file access. Caching is discussed in *When Opportunity Locks-Oplocks on Windows NT*, The NT Insider, Vol. 3, Issue 3, June 1996 |Published: 15 Jun. 96| Modified: 26 Aug. 2002, which is hereby incorporated herein by reference in its entirety.

WAN optimization and file caching can be used alone or together and therefore are considered to be complementary solutions. Generally speaking, file caching works reasonably well for file data that does not change frequently. If a file is cached and is updated at the central site, the users at a remote site may not be aware of this and may lead to using the stale file data. Furthermore, the contents of a file must be read or pre-fetched to fill the file cache before caching can result in faster file access. In addition, file caching does not cache directory contents. Therefore, directory related operations such as lookup or enumeration will still require client/server communication over the LAN and will consequently suffer poor performance.

A traditional file system manages the storage space by providing a hierarchical namespace. The hierarchical namespace starts from the root directory, which contains files and subdirectories. Each directory may also contain files and subdirectories identifying other files or subdirectories. Data is stored in files. Every file and directory is identified by a name. The full name of a file or directory is constructed by concatenating the name of the root directory and the names of each subdirectory that finally leads to the subdirectory containing the identified file or directory, together with the name of the file or the directory.

The full name of a file thus carries with it two pieces of information: (1) the identification of the file and (2) the physical storage location where the file is stored. If the physical storage location of a file is changed (for example, moved from one partition mounted on a system to another), the identification of the file changes as well.

For ease of management, as well as for a variety of other reasons, the administrator would like to control the physical storage location of a file. For example, important files might be stored on expensive, high-performance file servers, while less important files could be stored on less expensive and less capable file servers.

Unfortunately, moving files from one server to another usually changes the full name of the files and thus, their identification, as well. This is usually a very disruptive process, since after the move users may not be able to remember the new location of their files.

SUMMARY OF THE INVENTION

In accordance with one aspect of the invention there is provided a switched file system comprising a central network file manager and at least one remote network file manager in communication coupled to the central network file manager via a communication network, wherein the central network file manager manages reference copies of data and metadata and wherein the remote network file managers maintain mirrored copies of data and metadata for use in servicing client requests without having to communicate with the central network file manager.

In various alternative embodiments, the central network file manager and the at least one remote network file manager may maintain a common global namespace. The metadata may be mirrored from the central network file manager to the at least one remote network file manager using a lazy mirroring technique. The metadata may be mirrored, for example, in a breadth-first fashion or in a depth-first fashion.

The central network file manager may push metadata to the at least one remote network file manager. After pushing metadata to a remote network file manager, the central network file manager may verify that the metadata has not changed since being pushed and notify the remote network file manager that the metadata is valid. The central network file manager may maintain statistics regarding access patterns by remote clients and may push the metadata to the at least one remote network file manager based on the statistics.

Alternatively, a remote network file manager may pull metadata from the central network file manager. After receiving metadata from the central network file manager, the remote network file manager may request confirmation from the central network file manager that the metadata is still valid. The remote network file manager may maintain statistics regarding access patterns by clients and may pull the metadata from the central network file manager based on the statistics.

Metadata may be updated at a remote network file manager, in which case the remote network file manager may communicate the updated metadata to the central network file manager, and the central network file manager may notify the remote network file managers that the remote site metadata is unsynchronized so that the remote network file managers do not use the unsynchronized metadata.

Data may be mirrored from the central network file manager to the at least one remote network file manager using a lazy mirroring technique. When a file is updated at a remote network file manager, the remote network file manager may communicate the updated data to the central network file manager, and the central network file manager may notify the remote network file managers that the remote site data is unsynchronized so that the remote network file managers do not use the unsynchronized data. At least one of the central network file manager and the remote network file managers may maintain statistics regarding client accesses, in which case the data for such data mirroring may be selected based on the statistics.

The remote network file managers may pass oplock requests from client devices through to the central network file manager. Additionally or alternatively, the remote network file managers may handle oplock breaks and pass oplock breaks through to the client devices. The remote network file managers may flush cached contents back to the central network file manager, in which case the central network file manager may notify all remote network file managers to break file mirrors for the file.

The data and metadata may be copied from the central network file manager to the at least one remote network file manager according to a set of rules.

The remote network file manager may disallow access to mirrored copies of data and metadata when the remote network file manager is unable to communicate with the central network file manager over the communication network. Additionally or alternatively, the remote network file manager may disallow modification of mirrored copies of data and metadata when the remote network file manager is unable to communicate with the central network file manager over the communication network.

In accordance with another aspect of the invention there is provided a network file manager that operates as a client to file server nodes and as a server to client nodes and interacts with both the client nodes and the file server nodes using the standard network file protocols, wherein the network file manager implements SMB signing on communications with the file server nodes including SMB signing on messages used to pre-fetch data from the file server nodes.

In various alternative embodiments, the network file manager may further implement data compression on communications with the file server nodes.

In accordance with another aspect of the invention there is provided a WAN optimization appliance that operates as a client to file server nodes, wherein the appliance implements SMB signing on communications with the file server nodes including SMB signing on messages used to pre-fetch data from the file server nodes.

In various alternative embodiments, the appliance may implement data compression on communications with the file server nodes.

In accordance with another aspect of the invention there is provided a WAN optimization appliance comprising a broadcast service for delivering mirror break messages reliably and in priority from the central site to the remote sites.

In accordance with another aspect of the invention there is provided a WAN optimization appliance comprising a file transfer service for pre-positioning files from a central site to a number of remote sites. Additionally or alternatively, the appliance may obtain optimal fingerprints from a set of files to be pre-positioned and pre-positions these fingerprints to remote devices. The appliance may obtain fingerprints from file objects in a global namespace for fingerprint preloading at remote sites.

BRIEF DESCRIPTION OF THE DRAWINGS

The foregoing and advantages of the invention will be appreciated more fully from the following further description thereof with reference to the accompanying drawings wherein:

FIG. 6 shows a representation of an exemplary Table of Directory Transactions or Log in accordance with an exemplary embodiment of the present invention;

FIG. 7 shows a representation of an exemplary Table of Remote Site Replay Transactions in accordance with an exemplary embodiment of the present invention;

FIG. 8 shows a representation of an exemplary single persistent value kept for each directory in the partition on the remote site in accordance with an exemplary embodiment of the present invention;

DETAILED DESCRIPTION OF SPECIFIC EMBODIMENTS

Figure 1:
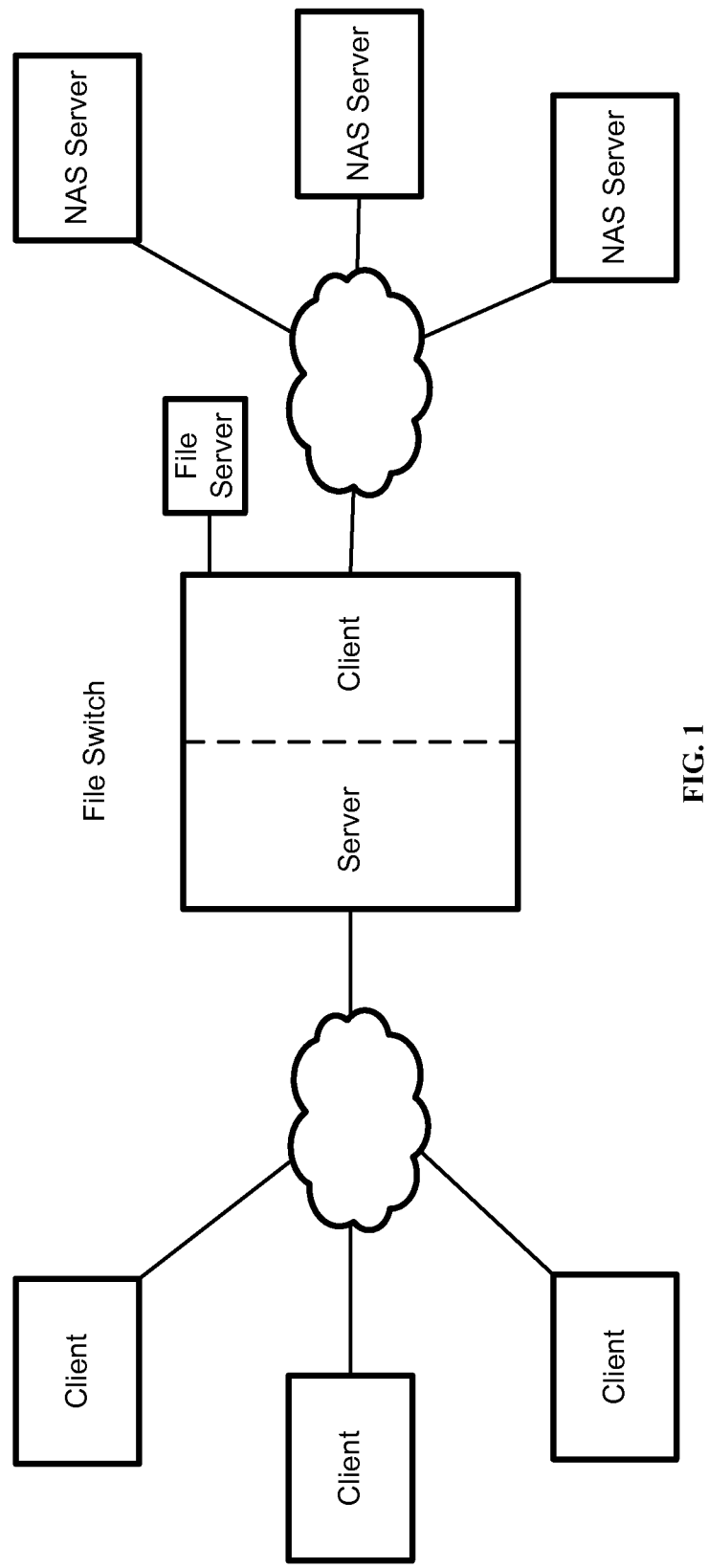
FIG. 1 is a schematic block diagram of a switched file system in accordance with various embodiments of the invention described in the related application incorporated by reference above.

Definitions. As used in this description and related claims, the following terms shall have the meanings indicated, unless the context otherwise requires:

Aggregator. An "aggregator" is a file switch that performs the function of directory, data or namespace aggregation of a client data file over a file array.

Data Stream. A "data stream" is a segment of a stripe-mirror instance of a user file. If a data file has no spillover, the first data stream is the stripe-mirror instance of the data file. But if a data file has spillovers, the stripe-mirror instance consists of multiple data streams, each data stream having metadata containing a pointer pointing to the next data stream. The metadata file for a user file contains an array of pointers pointing to a descriptor of each stripe-mirror instance; and the descriptor of each stripe-mirror instance in turn contains a pointer pointing to the first element of an array of data streams.

File Array. A "file array" consists of a subset of servers of a NAS array that are used to store a particular data file.

File Switch. A "file switch" is a device (or group of devices) that performs file aggregation, transaction aggregation and directory aggregation functions, and is physically or logically positioned between a client and a set of file servers. To client devices, the file switch appears to be a file server having enormous storage capabilities and high throughput. To the file servers, the file switch appears to be a client. The file switch directs the storage of individual user files over multiple file servers, using striping to improve throughput and using mirroring to improve fault tolerance as well as throughput. The aggregation functions of the file switch are done in a manner that is transparent to client devices. The file switch preferably communicates the with clients and with the file servers using standard file protocols, such as CIFS or NFS. The file switch preferably provides full virtualization of the file system such that data can be moved without changing path names and preferably also allows expansion/contraction/replacement without affecting clients or changing pathnames.

Switched File System. A "switched file system" is defined as a network including one or more file switches and one or more file servers. The switched file system is a file system since it exposes files as a method for sharing disk storage. The switched file system is a network file system, since it provides network file system services through a network file protocol—the file switches act as network file servers and the group of file switches may appear to the client computers as a single file server.

Data File. In accordance with exemplary embodiments of the present invention, a file has two distinct sections, namely a "metadata file" and a "data file". The "data file" is the actual data that is read and written by the clients of a file switch. A file is the main component of a file system. A file is a collection of information that is used by a computer. There are many different types of files that are used for many different purposes, mostly for storing vast amounts of data (i.e., database files, music files, MPEGs, videos). There are also types of files that contain applications and programs used by computer operators as well as specific file formats used by different applications. Files range in size from a few bytes to many gigabytes and may contain any type of data. Formally, a file is a called a stream of bytes (or a data stream) residing on a file system. A file is always referred to by its name within a file system.

Metadata File. A "metadata file," also referred as the "metafile," is a file that contains metadata, or at least a portion of the metadata, for a specific file. The properties and state information (e.g., defining the layout and/or other ancillary information of the user file) about a specific file is called metadata. In embodiments of the present invention, ordinary clients are typically not permitted to directly read or write the content of the metadata files by issuing read or write operations, the clients still have indirect access to ordinary directory information and other metadata, such as file layout information, file length, etc. In fact, in embodiments of the invention, the existence of the metadata files is transparent to the clients, who need not have any knowledge of the metadata files.

Mirror. A "mirror" is a copy of a file. When a file is configured to have two mirrors, that means there are two copies of the file.

Network Attached Storage Array. A "Network Attached Storage (NAS) array" is a group of storage servers that are connected to each other via a computer network. A file server or storage server is a network server that provides file storage services to client computers. The services provided by the file servers typically includes a full set of services (such as file creation, file deletion, file access control (lock management services), etc.) provided using a predefined industry standard network file protocol, such as NFS, CIFS or the like.

Oplock. An oplock, also called an "opportunistic lock" is a mechanism for allowing the data in a file to be cached, typically by the user (or client) of the file. Unlike a regular lock on a file, an oplock on behalf of a first client is automatically broken whenever a second client attempts to access the file in a manner inconsistent with the oplock obtained by the first client. Thus, an oplock does not actually provide exclusive access to a file; rather it provides a mechanism for detecting when access to a file changes from exclusive to shared, and for writing cached data back to the file (if necessary) before enabling shared access to the file.

Spillover. A "spillover" file is a data file (also called a data stream file) that is created when the data file being used to store a stripe overflows the available storage on a first file server. In this situation, a spillover file is created on a second file server to store the remainder of the stripe. In the unlikely case that a spillover file overflows the available storage of the second file server, yet another spillover file is created on a third file server to store the remainder of the stripe. Thus, the content of a stripe may be stored in a series of data files, and the second through the last of these data files are called spillover files.

Strip. A "strip" is a portion or a fragment of the data in a user file, and typically has a specified maximum size, such as 32 Kbytes, or even 32 Mbytes. Each strip is contained within a stripe, which is a data file containing one or more strips of the user file. When the amount of data to be stored in a strip exceeds the strip's maximum size, an additional strip is created. The new strip is typically stored in a different stripe than the preceding stripe, unless the user file is configured (by a corresponding aggregation rule) not to be striped.

Stripe. A "stripe" is a portion of a user file. In some cases an entire file will be contained in a single stripe, but if the file being striped becomes larger than the stripe size, an additional stripe is typically created. In the RAID-5 scheme, each stripe may be further divided into N stripe fragments. Among them, N-1 stripe fragments store data of the user file and one stripe fragment stores parity information based on the data. Each stripe may be (or may be stored in) a separate data file, and may be stored separately from the other stripes of a data file. As described elsewhere in this document, if the data file (also called a "data stream file") for a stripe overflows the available storage on a file server, a "spillover" file may be created to store the remainder of the stripe. Thus, a stripe may be a logical entity, comprising a specific portion of a user file, that is distinct from the data file (also called a data stream file) or data files that are used to store the stripe.

Stripe-Mirror Instance. A "stripe-mirror instance" is an instance (i.e., a copy) of a data file that contains a portion of a user file on a particular file server. There is one distinct stripe-mirror instance for each stripe-mirror combination of the user file. For example, if a user file has ten stripes and two mirrors, there will be twenty distinct stripe-mirror instances for that file. For files that are not striped, each stripe-mirror instance contains a complete copy of the user file.

Subset. A subset is a portion of thing, and may include all of the thing. Thus a subset of a file may include a portion of the file that is less than the entire file, or it may include the entire file.

User File. A "user file" is the file or file object that a client computer works with (e.g., read, write, etc.), and in some contexts may also be referred to as an "aggregated file." A user file may be divided into portions and stored in multiple file servers or data files within a switched file system.

File Virtualization in a Switched File System

FIG. 1 is a schematic block diagram of a switched file system in accordance with various embodiments of the invention described in the related application incorporated by reference above. Specifically, a file switch (which may also be referred to as a file virtualization appliance or MFM) is in communication with a number of clients over a communication network and is in communication with a number of file servers over the same or a different communication network. The file switch may also be in communication with one or more directly connected file servers. Thus, the file switch sits in the data path (either physically or logically) between the clients and the file servers for certain transactions. In specific embodiments, the file switch may be embodied as a product from Attune Systems, Inc. referred to as Maestro File Manager (MFM). The MFM may be provided in at least two different versions, specifically a standard version referred to as the FM5500 and a high-availability version referred to as the FM5500-HA.

The file switch may support a wide range of features and functionality such as, for example, providing a unified global namespace, providing storage virtualization, and managing storage of files in the file servers. File virtualization decouples file names from the physical file storage locations and hides the physical storage attributes of the files from the clients so that the users or applications are completely unaware which file server (or file servers) actually handles the file access. The file switch may store a file in a single file server or across multiple file servers, and may store files so as to emulate mirroring, striping, or other redundancy schemes. A native mode may be supported in which clients may communicate directly with the file servers in order to access certain files. The file switch may manage file storage based on a set of rules and may support reapply and relayout functions. The file switch may store certain small files along with metadata. The file switch may support other features described in the related applications.

As a result of separating the full name of a file from the file's physical storage location, file virtualization provides the following capabilities:

1) Creation of a synthetic namespace

Once a file is virtualized, the full filename does not provide any information about where the file is actually stored. This leads to the creation of synthetic directories where the files in a single synthetic directory may be stored on different file servers. A synthetic namespace can also be created where the directories in the synthetic namespace may contain files or directories from a number of different file servers. Thus, file virtualization allows the creation of a single global namespace from a number of cooperating file servers. The synthetic namespace is not restricted to be from one file server, or one file system.

2) Allows having many full filenames to refer to a single file

As a consequence of separating a file's name from the file's storage location, file virtualization also allows multiple full filenames to refer to a single file. This is important as it allows existing users to use the old filename while allowing new users to use a new name to access the same file.

3) Allows having one full name to refer to many files

Another consequence of separating a file's name from the file's storage location is that one filename may refer to many files. Files that are identified by a single filename need not contain identical contents. If the files do contain identical contents, then one file is usually designated as the authoritative copy, while the other copies are called the mirror copies. Mirror copies increase the availability of the authoritative copy, since even if the file server containing the authoritative copy of a file is down, one of the mirror copies may be designated as a new authoritative copy and normal file access can then resumed. On the other hand, the contents of a file identified by a single name may change according to the identity of the user who wants to access the file.

In exemplary embodiments of the invention, the file switch appears to the clients as a standard file server and appears to the file servers as a standard client. In such embodiments, communication between the clients and the file switch can utilize standard network file protocols (e.g., NFS and/or CIFS) without requiring any additional software running in the clients, and communication between the file switch and the file servers can utilize standard network file protocols (e.g., NFS and/or CIFS) without requiring any additional software running on the servers. In fact, the file switch could utilize one network file protocol when communicating with the clients and a different network file protocol when communicating with the file servers in certain embodiments. Additionally, or alternatively, the file switch may communicate with different types of clients using different protocols (e.g., some clients may use NFS while other clients may use CIFS), and, similarly, the file switch may communicate with different types of file servers using different protocols (e.g., some file servers may use NFS while other file servers may use CIFS). In one exemplary embodiment, the file switch may communicate with both NFS and CIFS clients but store files in the file servers using only CIFS. Since the file switch essentially operates as both a network file client and a network file server, the file switch may support a full range of client/server features such as, for example, SMB signing for authenticating communications with the clients and/or with the file servers.

Remote File Virtualization

A typical business environment may have branch offices located at many remote sites across a wide geographical area. However, the data center(s) that hosts the file servers are usually centralized in one or two sites. This allows for economies of scale, ease of management, as well as providing physical security.

Users at branch offices often need to access data stored at the central site. Unfortunately, the transmission speed of the wide area network connecting the users at the branch offices to the file servers located at the central site is usually much lower than the speed of the local area network (LAN). This is partly due to the cost of network connection links as well as the latency introduced by the physical distance separating a branch office from the central site. To overcome the transmission speed and to reduce latency of the WAN, one scheme is to deploy a "latency reduction" or "WAN access optimization" appliance at both the central site and at the remote site. However, a better strategy is to reduce or eliminate the need to send network packets across the WAN, for example, by satisfying as many of the file requests locally (i.e., at the remote site) as possible instead of having to send the requests across the WAN.

Furthermore, if certain files are typically authored or modified locally, it would be efficient to operate on local copies of the files. Normally, this would be solved by keeping the file locally at the remote office on an edge server (i.e., managed file servers at the remote sites). However, since the branch offices are not true data centers, there may be issues with managing these servers or NAS devices at the remote site, including backups, restores, and ongoing maintenance. Therefore, certain embodiments remove the need for managed edge servers while still providing the ability to write file locally at the remote site.

Thus, it is desirable for file virtualization to work both at the central site as well as the remote sites. It is also desirable that the central site and the remote sites share the same common namespace. Embodiments of the present invention described below extend file virtualization across the WAN in order to accelerate remote file access. For convenience, such extended file virtualization is referred to hereinafter as Remote File Virtualization.

Figure 2:
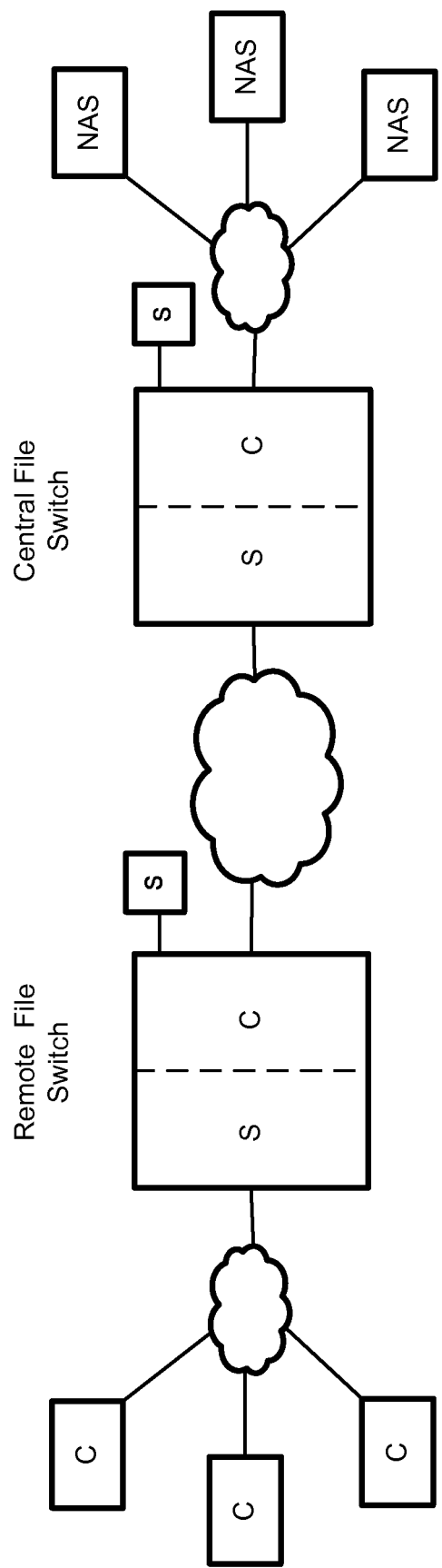
FIG. 2 is a schematic block diagram of a switched file system employing remote file virtualization in accordance with an exemplary embodiment of the present invention.

FIG. 2 is a schematic block diagram of a switched file system employing remote file virtualization in accordance with an exemplary embodiment of the present invention. Here, the switched file system includes two file switches, namely a central file switch situated near the file servers and a remote file switch situated near the clients. The central file switch and the remote file switch are in communication over a WAN such as the Internet. In this example, the remote file switch appears to the clients as a file server and appears to the central file switch as a client, while the central file switch appears to the remote file switch as a file server and appears to the file servers as a client. It should be noted that multiple remote file switches may operate with a single central file switch over the WAN.

In order to help reduce or eliminate certain communications over the WAN, copies of file data and/or metadata may be stored at the central site and at one or more of the remote site(s). One copy is typically considered to be the "authoritative" copy while the other copies are considered to be "mirror" copies. The authoritative copy may be at the central site or at one of the remote sites. Examples of both situations are described below. A mirror server is storage that may contain the current, past, or both current and past mirror copies of the authoritative copy of a file. No particular directory structure is assumed. A file virtualization appliance, such as the MFM described above, is responsible for keeping the contents of the mirror copies in sync with the authoritative copy. If the contents of a mirror copy are not identical with the authoritative copy of the file, the mirror is broken and the mirror copy is generally discarded.

The delay and the relatively less reliable WAN makes it impractical to keep the contents of the mirror copies stored at one site to be identical with the authoritative copy stored at another site. Instead of having one site notify all of the other sites to break the mirror if the authoritative copy has changed, in exemplary embodiments, each site is generally responsible for checking if its own mirror copy is identical with the authoritative copy. If the mirror copy is identical, then the file accesses generally can be satisfied locally, resulting in faster file access performance. If the contents are not identical, the mirror copy is generally not used, in which case file access requests are sent over the WAN to another site for processing. For example, file access requests may be forwarded from the central site to a remote site if the authoritative copy is not present on the central site.

In order to maintain a common namespace between the central site and remote sites, certain synchronization techniques are used to keep the namespace contents (information about a subset of files within the file system) consistent and in sync between the remote sites and the central site. A number of exemplary synchronization techniques are described below. Under the common namespace across the central site and all remote sites, applications or users at the remote site will not be aware of the actual location where the file requests are being serviced. By accessing a locally stored copy instead of the copy stored at the central site, users will perceive the situation as if the authoritative copy is stored locally even if the authoritative copy is actually stored at the central site or at another remote site. If the remote file switch is able to service a particular file request from a client at the remote location, then no communication over the WAN should be needed for that file request. As a result, there should be a substantial speed increase for the remote file access since local file access is typically faster than an access to the central site.

In certain embodiments of the present invention, remote file virtualization is accomplished using a lazy metadata mirroring technique together with a lazy file data mirroring technique and a reverse file data mirroring technique in order to maintain a common namespace across the central site and all the remote sites. These techniques will be described below.

Mirroring

One of the major functions of file virtualization is to provide data mirroring. Since the filename of a file is now independent of its storage location, the contents of a file may be served by more than one server for increasing availability. If one server is down, a backup server that contains the identical copy of the file, the mirror, could be used instead. Mirroring can be done on a per file basis, on a per directory basis, on a per volume basis, or from the result of a policy that identifies a set of files using a specific criterion.

For example, a Server 1 may be the primary server for servicing file A and a Server 2 may be used as the backup server and contains a mirror copy of file A. The MFM is responsible for maintaining the contents of the mirror copy of file A in the backup Server 2 to be in sync with the contents of the original file A in the Server 1. The file A in Server 1 is said to be the authoritative copy and is usually updated first and consulted first.

One way that file virtualization can help accelerate file access from a remote site across the WAN to a file server located at the central site is to preposition mirror copies of the file from the central site to the remote site (local to users), with the central site designated to store the authoritative copy of each file, and each remote site maintaining a mirror copy of the authoritative copy at the central site. This allows using the local mirror copies to satisfy as many file accesses as possible. As a result, if a user is accessing a mirror copy locally, the user will perceive that the authoritative copy is stored locally, even though the authoritative copy is actually stored at the central site. In exemplary embodiments, if a file is deleted or modified at the remote site, the central site is notified first, and then all MFMs at remote sites are notified of the file being deleted or modified, so that all MFMs have their metadata information updated.

In order to perform such mirroring, the MFM typically uses an active mirroring technique that involves applying the same file operation on file A to both Server 1 and Server 2. This mirroring technique also does not distinguish between data operations (read/write) or metadata operations (lookup, enumeration). All file operations are mirrored actively. Active mirroring generally also assumes that there are only a limited number of mirrors. There is no need, under normal situation, to have more than two or three mirrors for a file.

Files may be placed on the mirror server by pre-positioning or on the fly, for example, through the File Transfer Protocol (ftp). In an exemplary embodiment, each mirror copy in the mirror sever is identified by a 160-bit number, which is the sha1 digest computed from the contents of the mirror copy. A sha1 digest value is a globally unique value for any given set of data (contents) of a file. Therefore, if two files are identical in contents (but not necessarily name or location), they will always have the same sha1 digest values. And conversely, if two files are different in contents, they should always have different sha1 digest values.

Many approaches could be used to manage the storage space of the mirror server. For example, the storage space in the mirror server may be reclaimed periodically by purging mirrors that are least recently used. Alternatively, the mirrors are purged one at a time, and only when is needed, i.e. when storage space is needed in the mirror server to store a new mirror. It is important to note that the mirror server is unmanaged storage. The authoritative copy of the data always lives at the central site. If the mirror server is lost, or if mirrors are needed to be purged from the mirror server, the authoritative copy of the data can always be fetched from the central site.

Thus, having a mirror server affects only the read access performance and not the correctness of the read operation.

The computation of the sha1 digest is performed at the central site and is usually done periodically by a background process. The sha1 digest computation process walks through the directory hierarchy associated with a partitioned namespace, starting from the root of the directory hierarchy and inspecting every directory and sub-directory until all directories within the partitioned namespace are inspected. For each file that is idle (not opened) and without a sha1 digest, the process computes the sha1 digest and stores the sha1 digest as an extended attribute or as an alternate data stream within the metadata of a file. Newly created files do not have sha1 digests immediately after the file is created. In addition, the sha1 digest of a file, if it exists, is cleared immediately before the first update (write or setsize, for example) is set to occur to the file.

When a common namespace is reconstructed at a remote site, the metadata and the sha1 digest, if any, will also be duplicated at the MFM located at the remote site. The remote file virtualization appliance (MFM) will guarantee that as long as a parent directory is synchronized or is up-to-date with the authoritative copy at the central site, the metadata of all files and directories contained in the parent directory will also be up-to-date.

When a client at a remote client opens a file stored at the central site, the open request is actually sent to the MFM located at the remote site. The process to open a file is as follows:

The parent directory of the file to be opened is checked to see if it is synchronized with the authoritative copy stored at the central site, as described further herein. If the namespace is not synchronized, the open request is forwarded to the central site. If the open is successful, the authoritative file handle, hereafter referred to as auth file handle, is returned to the user. If not, an error code is returned to the user.

If the parent directory is synchronized with its authoritative copy at the central site, and if the file is open for create, delete, or for update, the open request is forwarded to the central site. If the open is successful, the auth file handle is returned to the user. If not, an error code is returned to the user.

Otherwise, an attempt is made to open the file locally first. If the open is not successful, an error code is returned. The file handle from opening the file locally is called the local file handle. Notice that the local file is actually a sparse file and does not contain any data (as discussed in the co-patent application). The local file's associated metadata may or may not be synchronized with the authoritative copy at the central site.

If the open of the local file is successful, then the open request is again forwarded to the central site. If the open at the central site is not successful, the local file is closed and an error code from the central site is returned to the user. This is because the central site has the authoritative copy of the file.

If the open of the file at the central site is successful, the local file handle is associated with the auth file handle. The auth handle is returned to the user.

When a file request is sent to the MFM, it must include a file handle (the auth file handle). The steps for handling a file identified by the input file handle are as follows:

If the request is a lock request, the lock request is forwarded to the central site. If the lock is not granted, the error code is returned back to user. If there is no local file handle, a success code is also returned to the user. Otherwise, the sha1 digest is obtained from the central site and from the local MFM. If they match, an open mirror file request with the file's sha1 digest as input is sent to the mirror server. If the mirror exists, a mirror file handle is returned. Otherwise, the mirror handle is set to null.

If the request is a forced lock-release, the process sends a forced lock request to the user so that the user can flush their data back to the local MFM and the local MFM again sends the modified data back to the central site.

If the request is a read operation and if a mirror file handle exists, the request is forwarded to the mirror server. Otherwise, the request is forwarded to the central site. The result from either the mirror server or from the central site is returned back to user.

If the request is a get file attributes operation and if the local file handle exists, the request is processed locally, using the local file handle. Otherwise, the request is forwarded to the central site using the auth file handle. The result from either the local site or from the central site is returned back to user.

Otherwise, all operations are sent to the central site using the auth file handle. The result is then sent back to the user.

Notice that all locking, write, or update attributes operations are sent to the central site. These operations will always incur the WAN latency overhead as well as the WAN transmission speed limitation.

The central site can always request any set of mirror copies stored in the mirror server at the remote sites to be purged. This is done by sending a list of sha1 digest values to a remote site. The remote site MFM will then purge all of the mirror copies from the mirror server whose sha1 digest matches the sha1 digest values in the purge list.

A variety of ways can be used to preposition the mirror copies on the mirror servers at the remote site. Since each mirror copy is uniquely identified by its sha1 digest, preposition of mirror copies can be done at any time and independently without regard to the actual state of the files at the central site. For example, the mirror copies can be stored on a removable storage device such as a USB disk or on a DVD and sent via express delivery nightly from the central site to the remote sites. At the remote site, the mirror copies can be loaded on the mirror server. Another method of prepositioning is to use satellites to broadcast the mirror copies to the remote sites. Of course, if the transmission speed of the network connection between the remote sites and the central site is fast enough, unicast or multicast networking protocols can be used to preposition mirror copies from the central site to the remote site via the WAN.

Lazy Metadata Mirroring

Active mirroring is not practical in a WAN environment because the low network bandwidth and high network latency of the WAN makes it difficult to synchronize the contents of a mirrored file at one or more remote sites with the authoritative copy at the central site in a timely manner, particularly when there are many remote sites whose mirrors will need to be updated in order to be in sync with the authoritative copy in the central site. Also, active mirroring in such situations may place a heavy load on the central site's MFM. As a result, clients at the remote site may end up accessing stale data under some circumstances.

In exemplary embodiments of the present invention, mirroring is divided into two processes, namely metadata mirroring and data mirroring. Instead of treating all operations (reads and writes) from the clients in the same manner, metadata requests and data requests are treated differently. Some of these differences are identified below.

By mirroring metadata to the remote MFM, the MFM at the remote site is able to respond directly to the metadata operations (terminate the metadata operations) and thus eliminate most metadata traffic between the remote sites and the central site under normal situations.

The metadata mirroring does not have to be completely in place between the remote site and the central site immediately in order to use the system. For example, the remote site initially could have its "root" set to point back to the central site. In this case, the remote MFM just forwards the metadata requests across the wire to the central site (with no particular savings due to the MFM at this point in time). As bandwidth is available, the central MFM could "push" subdirectory levels of information to the remote MFM. After each subdirectory is pushed, the central MFM should re-verify that the subdirectory has not changed since being pushed, and then notify the remote MFM that the remote MFM now has a valid mirror of the metadata. From this point in time, the remote MFM can terminate the metadata operations for that subdirectory, until the remote MFM is told that its mirror of the metadata is no longer valid (the remote metadata will generally be valid since there the mirroring of metadata is synchronous in nature). All other subdirectories that have not been mirrored continue to point back to the central site. Only subdirectories that have valid mirrors are terminated at the MFM at the remote site. In other words, performance advantages may be noticed immediately when a directory's metadata is mirrored, since those metadata requests can now be terminated at the remote site, before the entire set of metadata is mirrored.

This process of mirroring the metadata can continue pushing metadata as WAN bandwidth is available, until all of the metadata for shared files is pushed to the remote site. At that point, the remote MFM would have a complete mirror of the appropriate metadata, and maintenance of the metadata will be performed as a part of the synchronous metadata mirroring.

An alternative embodiment of the process of metadata mirroring uses a "pull" model, where the remote MFM requests metadata and the central MFM responds with the metadata itself. When all of the requested metadata has been sent, the remote MFM sends a message to the central site MFM asking whether the mirrored metadata sent to the remote MFM is currently valid (the metadata may have become invalid during the period of time when the metadata was being shipped from the central site to the remote site). If the metadata that was sent by the central site MFM is, in fact, valid, the central MFM responds back to the remote MFM with a "yes". If the metadata that was sent was not valid at that instant, then the central MFM responds back to the remote MFM with a "no". If the remote MFM receives a "yes", then it is able to consider its metadata mirror to be valid, and can terminate metadata requests. If the remote MFM receives a "no", then the remote MFM can just drop the metadata that it received and ask the central MFM to again start sending metadata at an appropriate time (e.g., when network bandwidth is again available).

The pull model embodiment may be preferable in certain embodiments, since central site resources may be limited. One advantage is that the mirroring of metadata generally occurs only when WAN bandwidth is available, and yet the remote clients can still perform metadata operations before the mirrored metadata is completed because the metadata operations can be referred back to the central site until the mirrored metadata is able to satisfy the request.

The process of mirroring the metadata can be done in a breadth first or depth first fashion. In some situations, particularly in a Windows environment, it may be better to perform metadata mirroring in a breadth first fashion because of the way Windows operates. For example, when accessing the file dir1\dir2\dir3\dir4\file.txt, each of the directories dir1, dir2, etc. . . . are opened sequentially, until finally the file.txt file is opened. If a breadth first mirroring is performed, the accesses early in the full path name are more likely to be terminated at the remote MFM.

As the subdirectories' metadata is mirrored, sparse files can be used, such that the metadata for each file is copied (size, last access time, last modified time, creation time, owner, permissions, etc.), but the data is not copied (and thus the file is truly sparse, containing absolutely no data).

Additionally, or alternatively, prior to the actual metadata mirroring, the remote site MFM or the central site MFM may keep track of remote site access patterns by remote clients and use those statistics to determine whether breadth first, depth first, or some combination of the two processes is most appropriate for a particularly metadata mirroring operation. If the statistics are gathered by the central site MFM, then they could contain either remote site specific access information or global remote site access information (information for all remote sites). This global remote site access information may be particularly useful when setting up a new remote site, since there may not be any access information for the remote site yet which is statistically relevant.

In the situation where some metadata is mirrored at a remote site and the metadata is being updated, there is the potential for accessing stale metadata. Therefore, in an exemplary embodiment of the invention, when metadata is updated at a remote site, the updated metadata is immediately communicated to the central site, and the central site then notifies the remote MFMs (metadata is not sent, just a notification sent) that the remote site metadata is out of sync. The remote MFMs then consider their own mirror for that particular metadata to be broken, in which case the remote MFMs know that the authoritative copy is back at the central site so any access to the broken mirrored metadata would need to be satisfied via a call to the central site to fetch the metadata, at least until the mirror is reestablished sometime later (performed lazily).

Lazy Data Mirroring and Reverse Data Mirroring

As discussed above, exemplary embodiments of the MFM generally will not support data mirroring from the central site to the remote site (synchronous mirroring will not be supported) because synchronous data mirroring to the remote site can create too much of a burden and network traffic while performing the data synchronization. Instead, exemplary embodiments of the invention use so-called "lazy data mirroring" at the file level from the central site to the remote sites. Selected files from the central site may be mirrored at the remote site. While these remote mirrors may exist, the authoritative copy is always at the central site.

In the situation where a file's data is mirrored at a remote site, and the file is being updated, there is the potential for accessing stale data. Therefore, in an exemplary embodiment of the invention, when a file is updated at a remote site, the updated data is immediately communicated to the central site, and the remote MFMs are notified (data is not sent, just a notification is sent) by the central site that the remote site data is out of sync. The remote MFMs then consider their own mirror for that particular file to be broken, in which case the remote MFMs know that the authoritative copy is back at the central site so any access to the broken mirrored file would need to be satisfied via a call to the central site to fetch the data, at least until the mirror is reestablished sometime later (performed lazily).

Remote clients accessing an in-sync mirrored file on the remote MFM will be "terminated" at the remote MFM, and the normally required network traffic will be averted.

This mirroring of data can be performed in any of a variety of ways. For example, data can be mirrored when it is first accessed (e.g., mirror data as it is being accessed, so subsequent accesses will terminate at the mirrored data on the remote MFM), data can be mirrored using pre-fetching (e.g., fetching the data based on information such as most recently or most frequently accessed data), or data can mirrored using pre-loading (e.g., pre-load the remote MFM with all data objects of the entire namespace before the MFM is shipped to a remote site with a slow network link).

In embodiments that mirror data using a prefetching process, prior to lazy data mirroring, the central site MFM or remote site MFM may keep track of remote client access patterns (statistics) and use those statistics to determine the order in which files should be lazy mirrored. If the statistics are gathered by the central site MFM, then they could contain either remote site specific access information, or global remote site access information (information for all remote sites). This global remote site access information may be particularly useful when setting up a new remote site, since there may not be any access information for the remote site yet which is statistically relevant.

The term lazy data mirroring is used because the mirroring itself does not happen synchronously. The mirroring operation generally only occurs when sufficient bandwidth is available. Note that the breaking of a mirror is done synchronously (i.e., immediately). Also note that, in the exemplary embodiments discussed above, the central site always holds the authoritative copy of the data. Therefore, if a remote site has any issues (e.g., goes down for an extended period of time), the remote site can simply drop its metadata and data and refer back to the authoritative copy back at the central site while it rebuilds its metadata and data mirrors.

Viewing this mirroring process from the point of view of the remote site, one can consider it "reverse data mirroring". Before a mirror is established, the remote MFM uses the central site copy of the data. Once the mirror is established, the remote site has a "valid" mirror of the file that the remote site will use to terminate data requests. The remote site's mirror will be valid until the remote MFM is notified that the remote mirror is no longer in sync (and thus no longer valid). At this point, the remote MFM refers back to the central site authoritative copy of the file until the mirror is re-established and made valid.

File Synchronization

The actual process of invalidating a lazy mirrored file can be achieved when the redirector/LAN manager grants the client a Level1 oplock to access and then write a file. In exemplary embodiments of the invention, the remote MFM passes these oplocks through to the central site MFM. When this Level1 oplock is noticed by the central site MFM, the central site MFM sends messages to all other remote site MFMs telling them that their lazy mirrored data for that file is no longer valid. Subsequent requests for data for the broken lazy mirrored data would be sent to the central site to be satisfied. The data mirror can be resynchronized at some opportune later time. (Note: if the metadata for the file is changed, those metadata changes are done synchronously, first going to the central site MFM, then all remote site MFMs are notified that their metadata mirrors are out of sync. The resynchronizing of the remote metadata mirrors can be done lazily, since the remote site MFMs with broken metadata mirrors can simply direct requests to the central site MFM to be satisfied. Eventually, the mirrored metadata can again be rebuilt, at some later opportune time).

Figure 3:
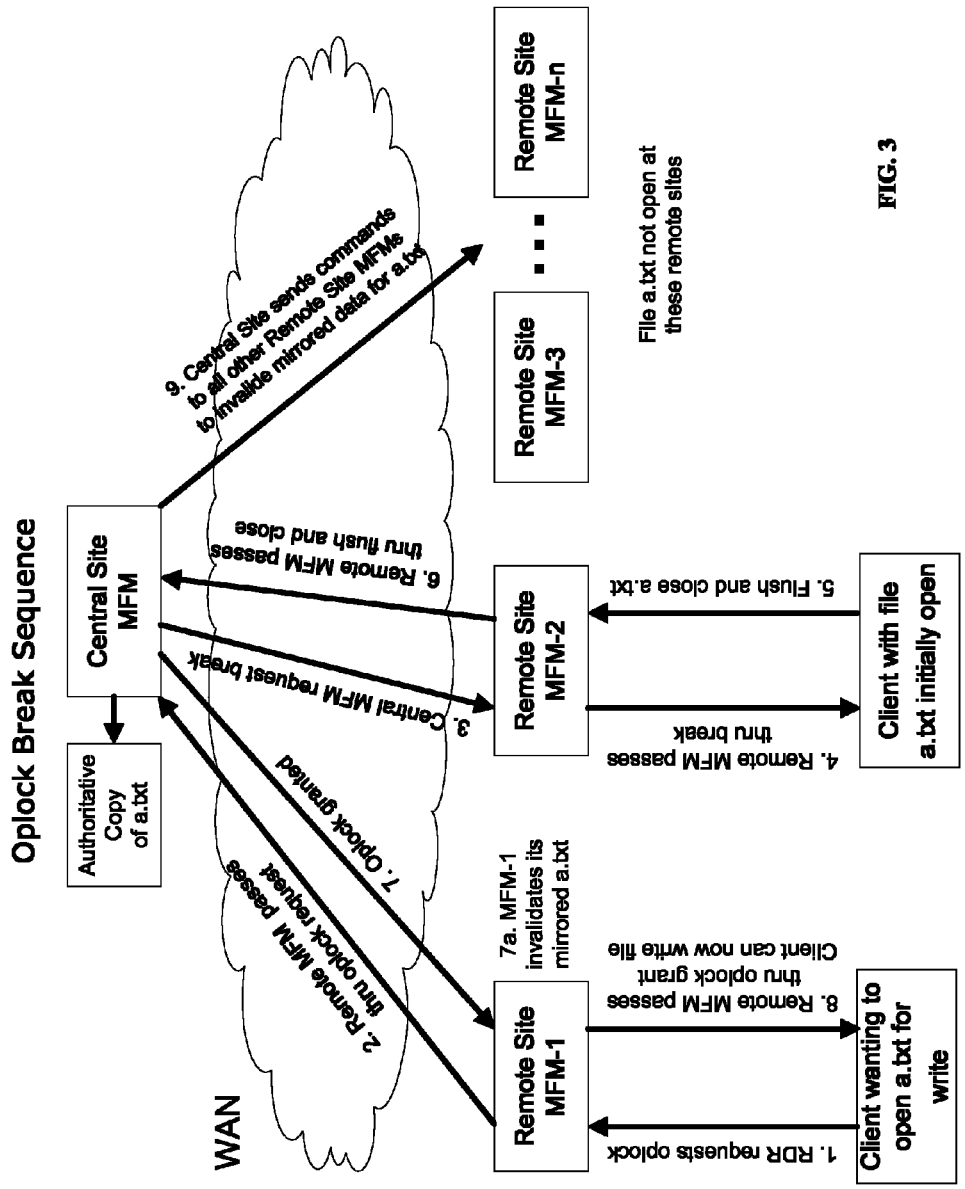
FIG. 3 depicts an oplock break sequence in accordance with an exemplary embodiment of the present invention.

FIG. 3 depicts an oplock break sequence in accordance with an exemplary embodiment of the present invention. First, the client wanting to open the file a.txt issues an oplock request (step 1), which is forwarded by Remote Site MFM-1 to the Central Site MFM (step 2). The Central Site MFM issues a request to break an existing oplock (step 3), which is forwarded by the Remote Site MFM-2 to the client having file a.txt open (step 4). That client issues a request to flush and close file a.txt (step 5), which is forwarded by Remote Site MFM-2 to Central Site MFM (step 6). The Central Site MFM then issues an oplock grant (step 7). The Remote Site MFM-1 invalidates its mirrored copy of file a.txt (step 7*a*) and forwards the oplock grant to the client (step 8), which is then permitted to write the file. The Central Site MFM sends commands to all other Remote Site MFMs to invalidate mirrored data for file a.txt (step 9).

The sequence shown in FIG. 3 is exemplary, and embodiments of the present invention are not limited thereby. It should be noted that some of the steps may be combined or may performed in a different order. For example, the Central Site MFM may broadcast a notification or command for all Remote Site MFMs to invalidate mirrored data for file a.txt in a single step either before or after forwarding the oplock grant.

In most systems, most file access is read-only in nature. Also, most file data is unlikely to change. Thus, the lazy data mirroring technique generally is a good tradeoff to reduce "synchronized" mirror data traffic between the central site and a remote site while speeding up normal read access and eliminating much of the WAN traffic. The lazy mirror process generally only performs mirroring operations when surplus WAN bandwidth is available.

One particular advantage of the MFM and the central site file system name space is that not all of the central site's files need to be shared. In exemplary embodiments of the invention, rules can be created such that only the applicable shared files and directories have their metadata mirrored and their data having the lazy data mirror on the remote site.

In exemplary embodiments, once exported, every remote site gets the same exported (shared) name space such that all remote sites share all the same subset of files of the central site file system name space.

It should be noted that there are synchronization issues to be addressed in the face of network (WAN) failures (i.e., failures in the network between the central and remote sites). If the MFM was never installed, remote clients would be unable to access data stored on the central site, even if a WAN Optimization Appliance (discussed below) was installed. However, if the MFM were installed at both the remote and client sites, access to data could be maintained under some circumstances even if the network link goes down. This is because the metadata is mirrored, and the file data could be available locally at the remote site in the lazy mirror. Of course, this could result in the remote clients accessing stale data (e.g., central site could have been updated, but with the network link down, the operation to invalidate the lazy mirror might not be received). This behavior (access to stale data) may be "better" in some instances than losing all access to the data. In other cases, however, one may never want to access stale data, and instead make sure that stale data is never accessed. In this case, the remote MFM could be made aware that the network link was down (e.g., through a heartbeat mechanism or through a mechanism where a ping back to the central office is performed every time the MFM terminates a request). Allowing access to stale data, or disallowing access to data when the network link is down, could be configurable so as to be under administrative control (and this control would be at the file level, as the rule for checking the network availability can be specified on a file by file basis, or some other grouping, based on file names, dates, or other attributes, and able to be specified in the MFM rules).

In exemplary embodiments, if a file is updated at a remote site, but the link to the central site is unavailable, the data update would be disallowed, because the authoritative copy of the data lives at the central site. This is no different for applications than in current network/WAN configurations where the application needs to deal with the central site being inaccessible (e.g., without the MFMs being present). Applications are required to deal appropriately with the write being disallowed due to the network being down (e.g., the application can drop the change or can store and save away the change for later transmittal to the central site).

If a remote site comes back up after being down, it could be updated (made to be in sync) either by dropping its metadata mirrors and lazy mirrors of data, and then recreating the metadata and data as bandwidth permits. Alternatively, it could be brought up to date (made to be in sync) via a dirty list mechanism (e.g., operations replayed to the remote MFM from the central site). The MFM could just pass through ALL requests (metadata and data) until the entire dirty list is replayed and the MFM is back in sync.

A central concept here is that, if anything happens to the metadata or data at the remote site, the central site contains the authoritative copy of the data, and the MFM's metadata and data can be recreated. Because of this, the MFM at the remote site does not necessarily need to be backed up nor be made highly available, since requests can still be satisfied by the central site.

It should be noted that the above-referenced functionality can be implemented without changing any application code or normal client processes.

It also should be noted that the remote MFMs are generally not required to implement the full functionality of the central MFM and therefore could be implemented as a separate product and/or on a different platform.

Common Global Namespace in Remote File Virtualization

In an exemplary embodiment, file virtualization technology is used to maintain a common global namespace between a central site and many remote sites across the WAN. The namespace exported by a central site is mirrored across all the remote sites. Exemplary embodiments use a transaction log and snapshots of the namespace to facilitate synchronizing the common namespace. Furthermore, the common namespace is maintained by performing the synchronization lazily to reduce the need of common namespace synchronization at the remote site.

In summary, exemplary embodiments may use file virtualization to construct a common global namespace among a central site and remote sites across the WAN. File virtualization decouples the identification of a file or directory from the file's or directory's physical storage location and therefore a namespace can be constructed independent of the underlying file systems. The namespace exported by the central site is mirrored across all remote sites to create a common global namespace. A per-directory transaction log and a namespace snapshot are used at the central site to facilitate synchronizing the common namespace among all sites. Remote sites are responsible for synchronizing the common namespace and this synchronization is done lazily and only when needed. Other techniques are employed to further reduce the need for remote sites to communicate with the central site for the purpose of checking whether the contents of a directory are synchronized.

Figure 4:
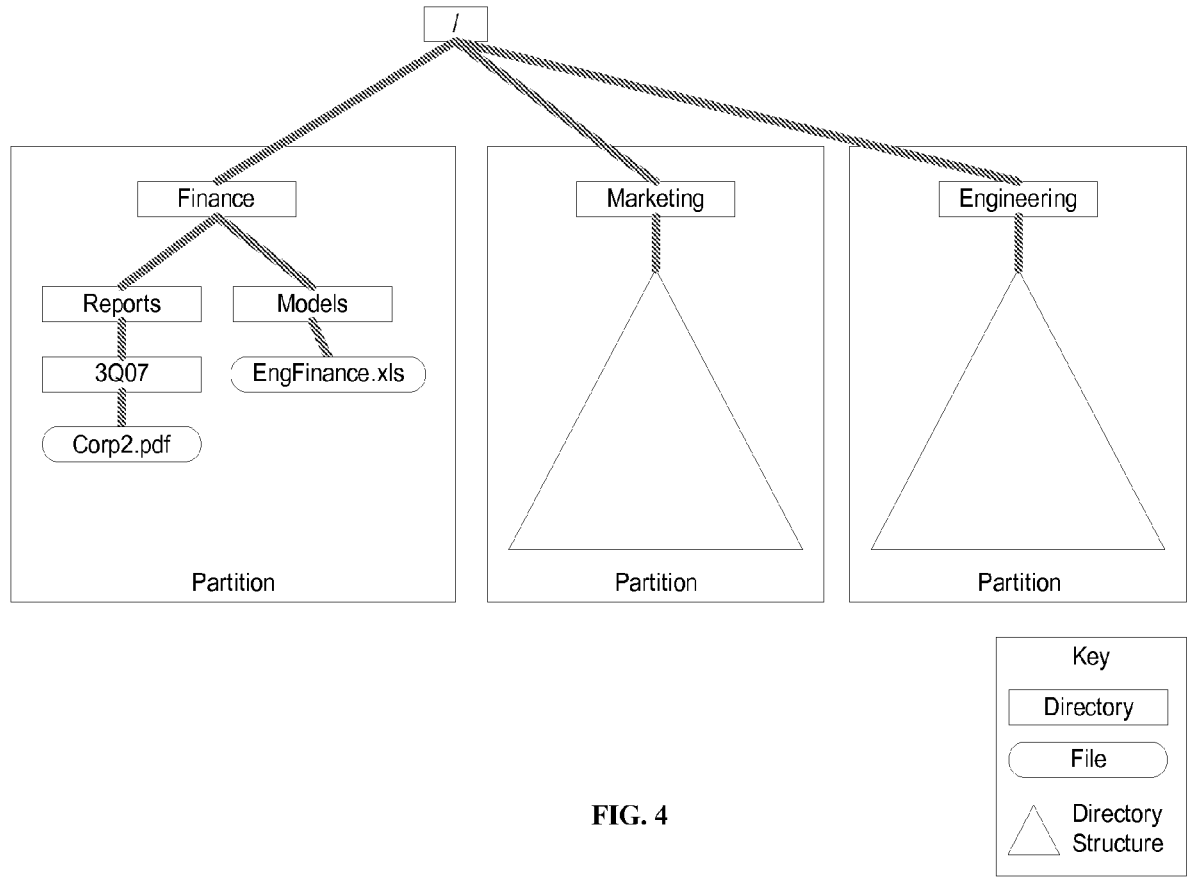
FIG. 4 shows a representation of virtual partitions that are "carved" out of the namespace such that all of the namespaces contained in each virtual partition are non-overlapping and the union of all the namespaces contained in each virtual partition is the same as the entire global namespace itself, in accordance with an exemplary embodiment of the present invention.

The storage for the global namespace is constructed from of one or more file system partitions exported from file servers located at the central site. This storage is then used for the global namespace itself. Virtual partitions are "carved" out of the namespace such that all of the namespaces contained in each virtual partition are non-overlapping, and the union of all the namespaces contained in each virtual partition is the same as the entire global namespace itself. Thus, as depicted in FIG. 4, each non-overlapping global namespace partition, hereafter referred to as a partition, contains a directory hierarchy consisting of directories, subdirectories, and file objects. Various embodiments allow the placement of the authoritative copy of metadata of one or more of the partitions to reside at a remote site. Therefore, in the example shown in FIG. 4, the Engineering department could be at a remote site, and the metadata for the Engineering partition could have its authoritative copy reside at that remote site while the metadata for the other partitions could have their authorized copies reside at the central site. In exemplary embodiments, the synchronization authority for a partition resides at the site that owns the partitioned namespace and hosts the authoritative copy of the metadata of the partitioned namespace.

Other sites consult the synchronization authority to determine if their mirror copy of the data or metadata is valid, as well as to request locks.

Figure 5:
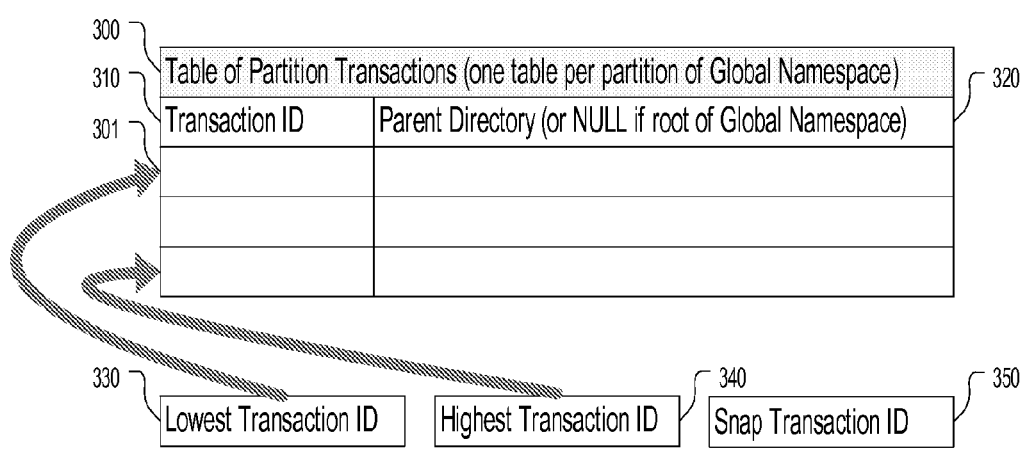
FIG. 5 shows a representation of an exemplary Table of Partitions Transactions in accordance with an exemplary embodiment of the present invention.

Each partition has a Table of Partition Transactions or log. An exemplary Table of Partitions Transactions is depicted in FIG. 5. This table of partition transactions (300) records all of the transactions that have been performed on any directory in the partition.

Each transaction in a partition is identified by a unique transaction id (TID). The TID of a partition is a monotonic increasing number starting from 1. The first transaction of a partition has an assigned TID equal to 1. The next assigned TID is one greater than previously assigned TID. A TID, once assigned, will not be reassigned or reused.

In addition, the partition also records the Lowest Transaction ID (330), the Highest Transaction ID (340), and a Snap Transaction ID (350) which will be described shortly. Each entry (301) in the partition transaction table (300) consists of a Transaction ID (310) of the transaction, and the Parent Directory (320) on where the transaction was performed.

Each directory in the directory hierarchy that is in the global namespace contains a Table of Directory Transactions or Log. An exemplary Table of Directory Transactions or Log is depicted in FIG. 6. This Table of Directory Transactions (400) records every transaction (401) that has been performed on that particular directory.

The contents of a Table of Directory Transactions (400) consists of Transaction ID (410) which identifies the transaction that operated on the directory, Deleted (420) indicating that a directory was subsequently deleted (and this operation may be skipped in certain instances), File or Subdirectory Name (430), Action (440) described below, Attributes (450) which include all necessary attributes such as access permissions, create and deletion times, etc. . . .

In addition, each directory also records the Highest Child Transaction ID (460) which is the highest transaction ID of files or subdirectory in this directory, the Highest Descendant Transaction ID (470) which is the highest transaction ID of any file or subdirectory in this directory, in any subdirectory of this directory, in any subdirectory of those subdirectories, etc., My Created Transaction ID (480) which is the transaction ID of when this directory was created, and My Last Transaction ID (490) which is the last transaction ID that was entered into this table. The transaction entry (401) with a Transaction ID (410) equal to My Last Transaction ID (490) may not be currently present in the table. This is because the table's entries (401) may have been trimmed. Trimming will be explained shortly.

An Action (440) will always be one of the following types: Create file, create directory, rename file, rename directory, delete file, delete directory, changing the size of a file or changing any of the file or directory attributes.

Note: If the source or destination target in the rename operation is NOT in the same directory, it will be recorded as a delete operation in the source directory and the create operation as the target directory.

The Table of Partition Transactions (300) and all of the Tables of Directory Transactions (400) will continue to grow infinitively as additional transactions are performed. Therefore, it is needed periodically to trim the tables. Trimming is performed by first mirroring the entire partition directory hierarchy without user data onto a mirror partition. That is, the entire directory tree structure is mirrored, but not the data. All files will become sparse files (sparse files are files that do not occupy any storage) but with the file size set correctly. The mirror between the partition and its mirror partition is then broken at a specific time. The mirror partition now contains a snapshot of the metadata of the original partition at a specific transaction ID, which is referred to as the Snap Transaction ID (350). The mirror partition containing the metadata snapshot is hereafter referred to as a snapshot.

Once the snapshot is created, the Table of Partition Transactions (300) and all of the Tables of Directory Transactions (400) can be trimmed. Trimming means that all of the transaction entries (301 and 401) with a Transaction ID (310 and 410) that is less than or equal to the Snap Transaction ID (350) can be deleted from the tables (300 and 400). As new transactions occur on the partition, they are appended to the Table of Partition Transactions (300) and the appropriate Table of Directory Transactions (400). The snapshot represents the state of the partition at the Snap Transaction ID (350) which should be equal to 1 less than the Lowest Transaction ID (330), since transaction IDs are monotonically increasing by one each time.

The snapshot mechanism itself is frequently provided by the native file systems used as storage for the global namespace. For example, Microsoft's NTFS provides a snapshot facility with their VSS. Such native snapshot mechanisms can be used to optimize the mechanism to create a partition snapshot.

The Table of Partition Transactions (300) and the Tables of Directory Transactions (400) are used to facilitate the synchronization of mirrors at remote sites.

Given a Table of Partition Transactions (300) that has not been trimmed, at the remote site one can simply apply all of the transactions in this table to an empty partition, to create a mirror of the current partition's namespace. Once a Table of Partition Transactions (300) has been trimmed, at the remote site one simply needs to first reconstruct the common global namespace by copying the snapshot from the central site to the remote site. Then, starting with the snapshot of the partition at Snap Transaction ID (350), apply all of the entries (301) in the Table of Partition Transactions (300) that have a Transaction ID greater than the Snap Transaction ID (350). The result is a reconstructed common global namespace at the remote site that is a mirror of the central site's current partition namespace.

To enable the synchronization and subsequent use of the global namespace at a remote site, a few tables are maintained at the remote site. The first, referred to as the Table of Remote Site Replay Transactions (500), is an augmented version of the Table of Partition Transactions (300) with a new column, Done (520), added. An exemplary Table of Remote Site Replay Transactions (500) is shown in FIG. 7.

Some additional values are associated with the Table of Remote Site Replay Transactions (500). Lowest Transaction ID (540) is the transaction ID of the first entry (501) in the table (500). Since the Table of Remote Site Replay Transactions (500) is an augmented version of the central site's Table of Partition Transactions (300), the remote site's Lowest Transaction ID (540) value will be the same as the central site's Lowest Transaction ID (330) value at the moment the table was copied.

Another associated value with the Table of Remote Site Replay Transactions (500) is the Highest Transaction ID (560). Highest Transaction ID (560) is the transaction ID of the last entry (501) in the table (500). Since the Table of Remote Site Replay Transactions (500) is an augmented version of the central site's Table of Partition Transactions (300), the remote site's Highest Transaction ID (560) value will be the same as the central site's Highest Transaction ID (340) value at the moment the table was copied.

The final associated value with the Table of Remote Site Replay Transactions (500) is the Last Processed Transaction ID (550). This value is persistent for each partition whose namespace is mirrored at the remote site. The Last Processed Transaction ID (550) starts at 0, and gets set to a new value that is the larger of (1) the central site's Snap Transaction ID (350) at the moment the table was copied from the central site and (2) the current Last Processed Transaction ID (550). As transactions are being replayed, the Last Processed Transaction ID (550) is updated such that all entries (501) less than or equal to the Last Processed Transaction ID (550) are marked as Done (520) since those entries (501) have all been processed.

FIG. 8 shows an exemplary single persistent value kept for each directory in the partition on the remote site. The My Last Transaction ID (600) is the value of the last transaction ID that was processed and replayed in this directory.

All of the tables discussed so far are used for synchronizing the remote site's namespace with the central site's authoritative namespace. It is the responsibility of the remote site's MFM to synchronize the contents of its mirror directory with the authoritative copy at the central site. The basic idea is for the remote site to reconstruct the global namespace first from the snapshot and apply the transactions one at a time. When a lookup in the namespace occurs at the remote site, the remote MFM determines if the remote site's global namespace is synchronized enough to satisfy the particular lookup. If not synchronized enough, a synchronization process to synchronize the global namespace at the remote site with the central site is triggered in the background, and the lookup of namespace information is satisfied by using the central site's global namespace, the authoritative copy.

Figure 9:
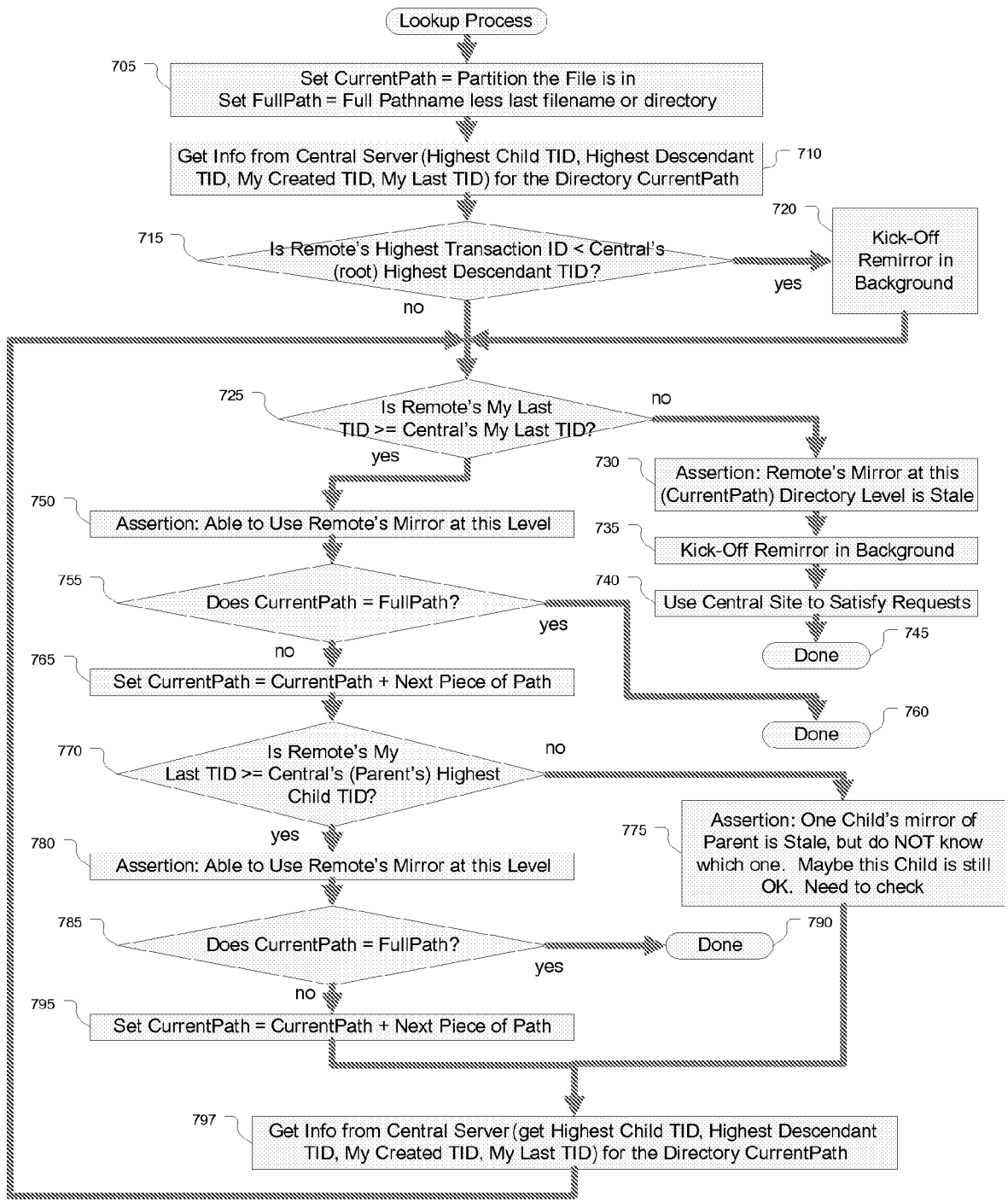
FIG. 9 is a logic flow diagram showing a representation of an exemplary algorithm to determine if the remote site's mirror copy of the namespace is synchronized enough, in accordance with an exemplary embodiment of the present invention.

An exemplary algorithm to determine if the remote site's mirror copy of the namespace is synchronized enough is shown in FIG. 9.

The following are the steps to perform a lookup of metadata at the remote site, as shown in FIG. 9:

Step 1 (705): Initialization steps include setting the CurrentPath=the partition that the file of interest is one, as well as setting the FullPath=the full pathname, excluding the filename or last component of the path if the path refers to a directory (for example, the FullPath of \partition\dir1\dir2\filename.txt is \partition\dir1\dir2 while the FullPath of \partition\dir1\dir2 is \partition\dir1). The last component of the pathname (filename.txt and dir2 respectively in the examples) will be either resolved locally or at the central site.

Step 2 (710): Retrieve the four values Highest Child Transaction ID (460), Highest Descendant Transaction ID (470), My Created Transaction ID (480), and My Last Transaction ID (490) from the central site for the directory CurrentPath. The Highest Descendant Transaction ID (470) for the root directory is identical to the Highest Transaction ID (340).

Step 3 (715): Determine if a background synchronization should be performed by comparing remote site's Highest Transaction ID (560) with central site's Highest Descendant Transaction ID (470) of the root of the partition. If a synchronization should be performed, actually perform the synchronization in the background at an appropriate time (synchronizations can be set to occur no more frequently than a specified interval, for example).

Step 4 (725): Determine if the remote site's mirror at CurrentPath can be used, or if the authoritative copy at the central site must be used by comparing the remote site's My Last Transaction ID (600) for the CurrentPath directory with the central site's My Last Transaction ID (490) previously returned. If the remote mirror cannot be used, kick off a synchronization of the mirror (735), and satisfy the request with the authoritative copy of the metadata from the central site (740) and exit the process).

Step 5 (750 and 755): At this point, the remote site's mirror can be used. Check if the algorithm is done by checking if the CurrentPath is equal to the full pathname needed (FullPath). If so, exit the process and use the remote site's mirror to lookup the last component of the pathname.

Step 6 (765): Set CurrentPath=CurrentPath+the next piece of the path from FullPath.

Step 7 (770 and 775): Determine if the remote site's mirror at CurrentPath can be used, or if the authoritative copy at the central site must be used by comparing the remote site's My Last Transaction ID (600) for the CurrentPath directory with the central site's Highest Child Transaction ID (460) previously returned. Note that this Highest Child Transaction ID (460) is a property of the Table of Directory Transactions (400) for the parent directory of CurrentPath. Failing this test does not indicate that the remote site mirror cannot be used. Failure merely indicates that one child mirror of the parent is stale. The CurrentPath directory might still be OK, and this needs to be checked. If the test failed, then go to step 10.

Step 8 (780): Check if the algorithm is done by checking if the CurrentPath is equal to the full pathname needed (FullPath). If so, exit the process and use the remote site's mirror.

Step 9 (795): Set CurrentPath=CurrentPath+the next piece of the path from FullPath.

Step 10 (797): Retrieve the four values Highest Child Transaction ID (460), Highest Descendant Transaction ID (470), My Created Transaction ID (480), and My Last Transaction ID (490) from the central site for the directory CurrentPath.

In summary, if the remote site's locally mirrored metadata at any particular level of the directory structure can be used, then it is unnecessary to send this particular data from the central site to the remote site. If the remote site's mirrored metadata cannot be used, then a resynchronization is kicked off (735) in the background, and the central site is used to satisfy the metadata requests (740) until the synchronization is completed.

Figure 10:
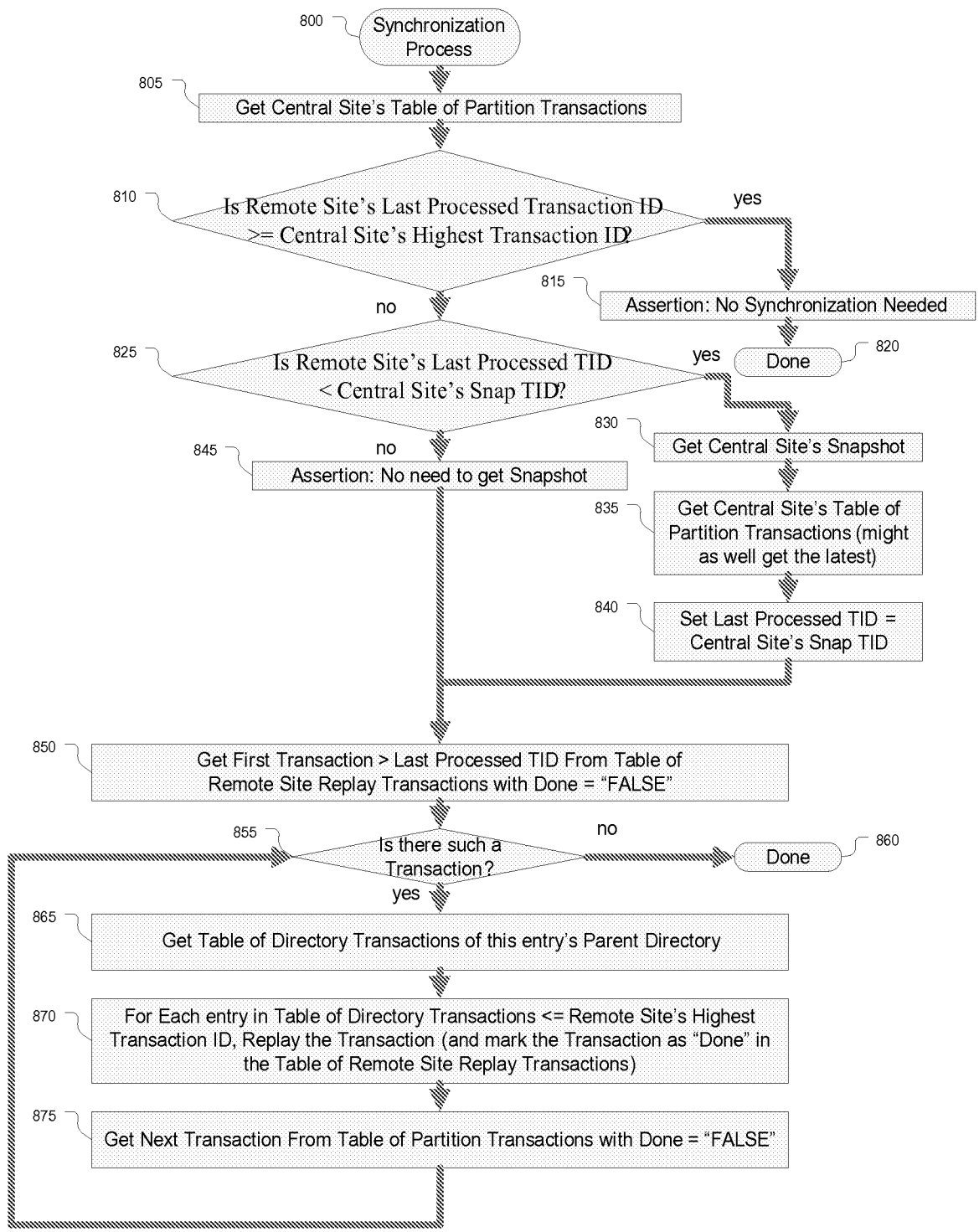
FIG. 10 is a logic flow diagram showing a representation of an exemplary algorithm for performing synchronization in accordance with an exemplary embodiment of the present invention.

As mentioned earlier, synchronization of the mirror at the remote site with the central site's authoritative copy is the responsibility of the MFM at the remote site. Once synchronization is needed, the exemplary algorithm in FIG. 10 may be used to perform the actual synchronization.

The following are the steps of the synchronization process (800) performed by the remote site's MFM:

Step 1 (805): Get the Table of Partition Transactions from the Central Site. Augment the table to create the Table of Remote Site Replay Transactions (500) by setting the Done column (520) of each entry (501) to "FALSE".

Step 2 (810): Determine if a synchronization is really needed by checking the Remote Site's Last Processed Transaction ID (550) against the Central Site's Highest Transaction ID (340)

Step 3 (825): Check if the current remote site's metadata is sufficient to work with the Table of Remote Site Replay Transactions (500) by checking to make sure that the last Snap Transaction ID (350) is less than the remote site's Last Process Transaction ID (550). If not sufficient, continue with Step 4, otherwise go to step 7.

Step 4 (830): Get the central site's snapshot as the base to replay transactions against.

Step 5 (835): Get the Table of Partition Transactions from the Central Site. Augment the table to create the Table of Remote Site Replay Transactions (500) by setting the Done column (520) of each entry (501) to "FALSE". This is done again to make sure that the latest table (300) has been retrieved, since the table (300) may have changed since the initial retrieval, while the snapshot metadata was retrieved.

Step 6 (840): Set the remote site's Last Processed Transaction ID (550) equal to the central site's Snap Transaction ID (350)

Step 7 (850): The first entry (501) of to work with is the first transaction with a Transaction ID (510) greater than Last Processed Transaction ID (550) that also has Done (520)="FALSE".

Step 8 (855): If no such entry (501) exists, then the synchronization process is complete, otherwise continue.

Step 9 (865): Retrieve a copy of the central site's Table of Directory Transactions (400) for this entry's (501) Parent Directory (530).

Step 10 (870): For each entry in the remote site's copy of the Table of Directory Transactions (500), replay the transaction in this directory. However, there is no need to replay transactions (400) whose Transaction ID (410) is greater than the Remote Site's Highest Transaction ID (560). This situation may arise since transactions continue to occur, but this algorithm continues to use the previously retrieved Table of Partition Transactions (300). As each transaction is replayed on the remote site, mark the Done (520) value to "TRUE" in the Table of Remote Replay Transactions (500). When done, the remote site's copy of the Table of Directory Transactions (400) can be deleted. The value of this directory's My Last Transaction ID (600) is set to the last transaction ID replayed, and persisted.

Step 11 (875): Get the next entry (501) from the Table of Remote Replay Transactions (500) that is larger than the remote site's Last Processed Transaction ID (550) that also has Done (520)="FALSE". Set Last Processed Transaction ID (550) to the Transaction ID (510) immediately preceding this entry. Continue with Step 8.

In summary, it is the responsibility of the remote MFM to actually perform the synchronization. If a mirror is not available, the needed metadata is always available at the central site where the authoritative copy exists.

EXAMPLE

The following is an example of the how the Table of Partition Transactions (300) and the Tables of Directory Transactions (400) are maintained as files and directories are added and deleted from a partition.

Figure 11:
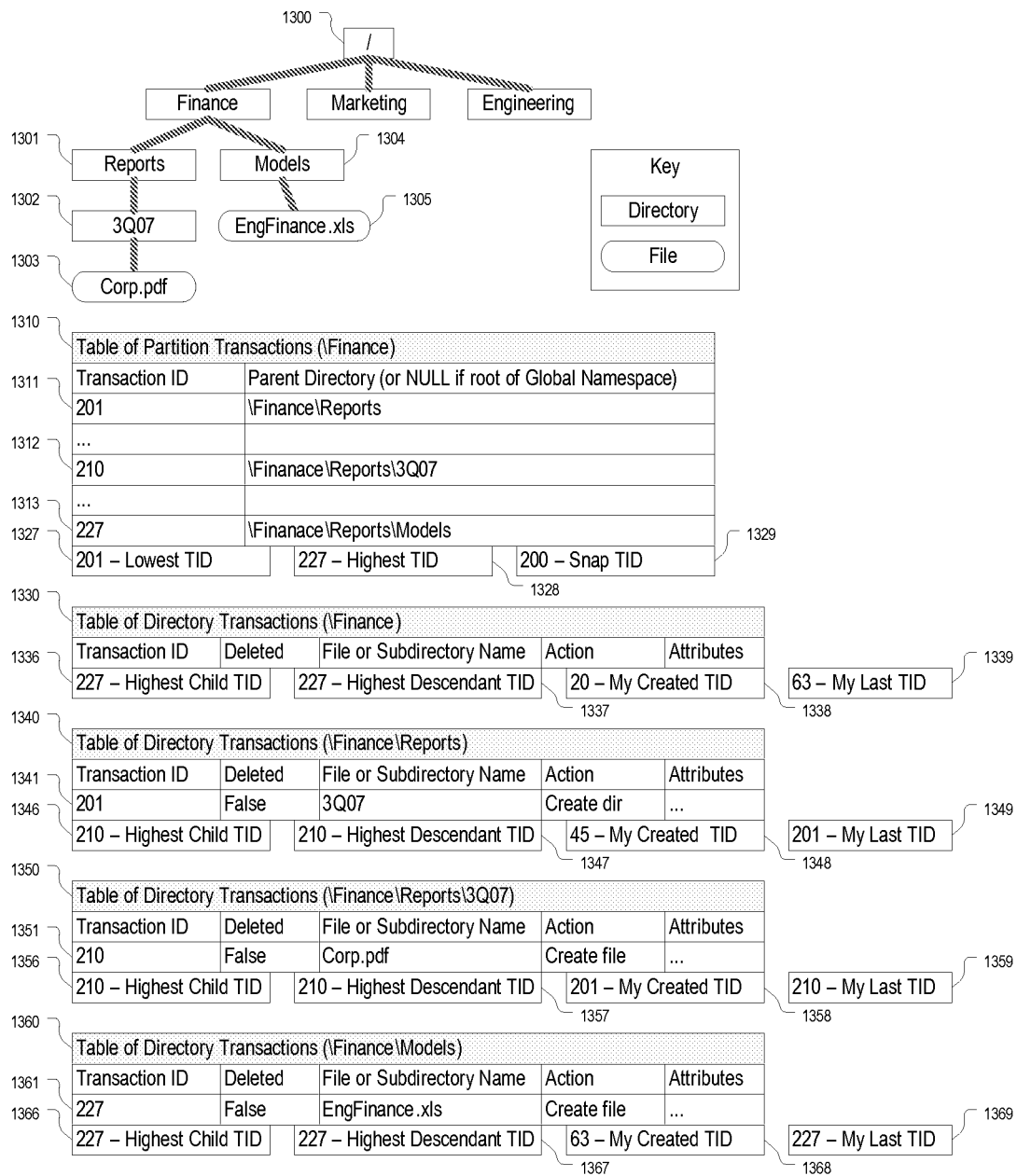
FIGS. 11-16 show representations of the files and directories in a sample partition as well as representations of how the Table of Partition Transactions and the Tables of Directory Transactions are maintained as files and directories are added and deleted from the sample partition, in accordance with an exemplary embodiment of the present invention.

Shown in FIG. 11 is a sample starting state of a partition. A directory structure is shown (1300), consisting of three partitions (Finance, Marketing, and Engineering). The Finance partition consists of 2 subdirectories: Reports (1301) and Models (1304). The Reports (1301) subdirectory has the further subdirectory 3Q07 (1302). In 3Q07 (1302) is a single file, Corp.pdf (1303). In the Models directory (1304) is a single file, EngFinance.xls (1305).

The Table of Partition Transactions for \Finance is shown (1310). The table has been previously trimmed since Snap TID (1329) is a value larger than 0. A number of transactions are in the Table of Partition Transactions (1310) and the Tables of Directory Transactions (1330, 1340, 1350, and 1360). The transactions which are of interest are the creation of the directory \Finance\Reports\3Q07 as Transaction ID 201 (1311), the creation of the file \Finance\Reports\3Q07\Corp.pdf as Transaction ID 210 (1312), and the creation of the file \Finance\Models\EngFinance.xls as Transaction ID 227 (1313).

Figure 12:
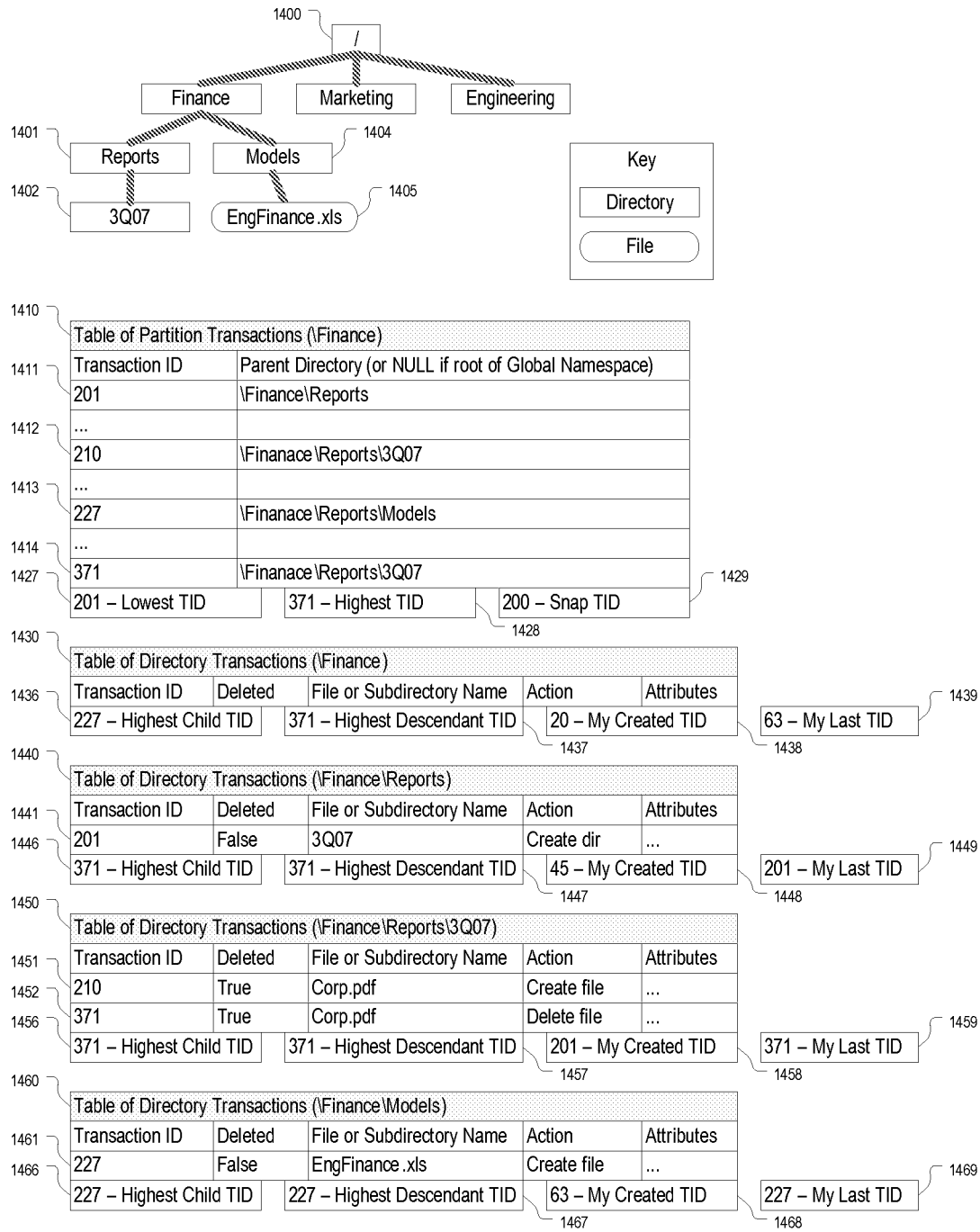

The first operation that will be performed to transition from FIG. 11 to FIG. 12 is to delete the file \Finance\Reports\3Q07\Corp.pdf (1303). This causes a new Transaction ID 371 to be entered into the Table of Partition Transactions (1414), as well as the Table of Directory Transactions for \Finance\Reports\3Q07 (1452). It should be noted that Transaction ID 210 (1451) is also modified to change the Deleted flag to "True", since the file is now deleted, and the Transaction 210 can be safely skipped in some instances.

Additionally, other values are updated appropriately, based upon the current state of the partition (1428, 1437, 1446, 1447, 1456, 1457, and 1459).

Figure 13:
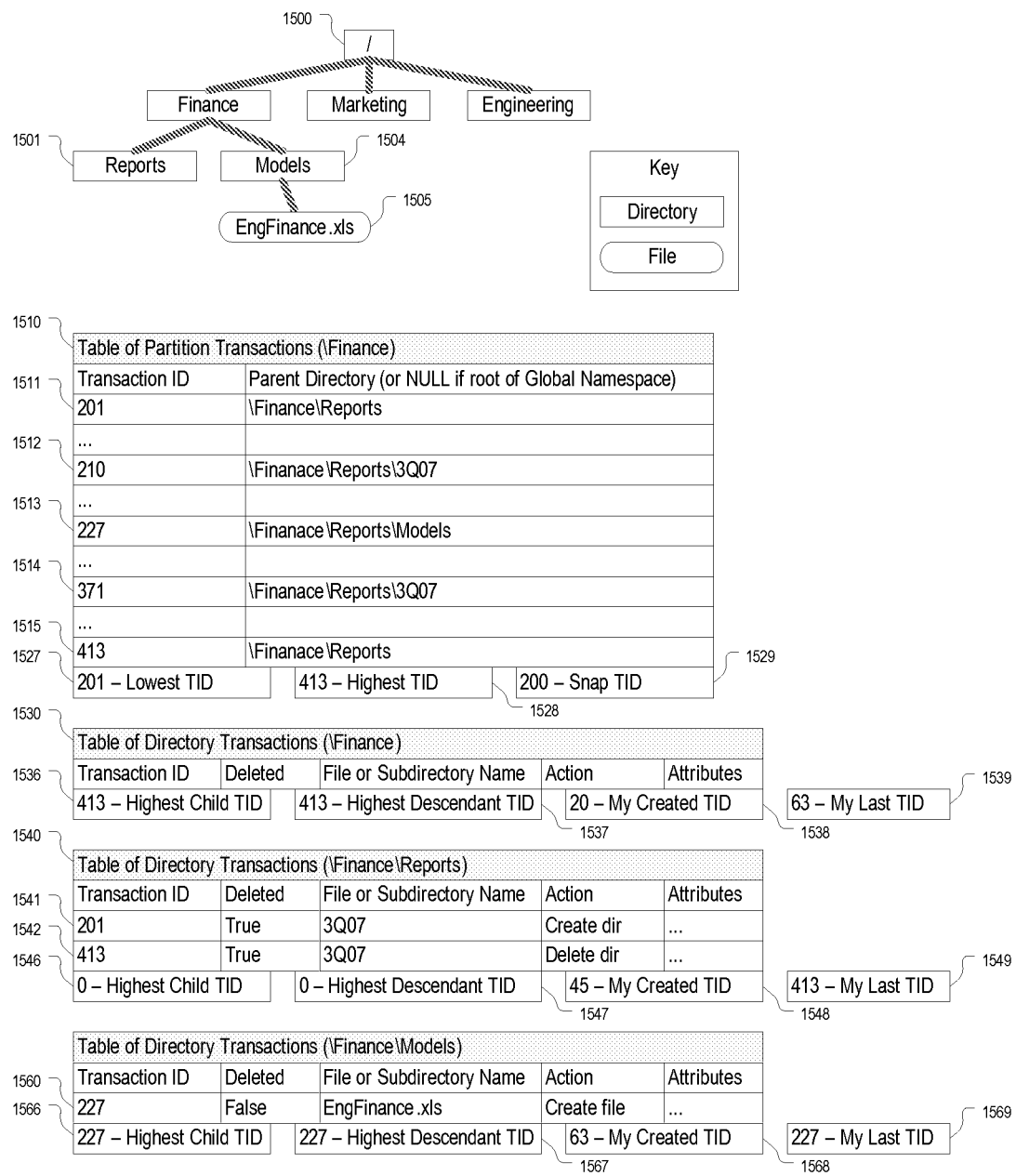

To transition from FIG. 12 to FIG. 13, the directory \Finance\Reports\3Q07 (1402) is deleted (since the directory is now empty, this is possible). This results in a new transaction, Transaction ID 413, which is in entered in the Table of Partition Transactions for \Finance (1515) and the Table of Directory Transactions for the directory \Finance\Reports (1542). Also, the Transaction 201 (1541) is modified to indicate that the directory was subsequently deleted (this transaction does not need to be replayed in some instances). The Table of Directory Transactions for the directory \Finance\Reports\3Q07 (1450) is removed in the transition to FIG. 13.

In addition, other values are updated appropriately, based upon the current state of the partition (1528, 1536, 1537, 1546, 1547, and 1549).

At some later point in time, the directory \Finance\Reports\3Q07 (1602) is created again in transitioning from FIG. 13 to FIG. 14. It should be noted that this is an entirely new directory. The previous 3Q07 directory was deleted. A new Table of Directory Operations (1650) is created for 3Q07 (and note that My Created ID (1658) for 3Q07 is set with the appropriate Transaction ID). Also, a Transaction ID 550 is entered in the Table of Partition Transactions (1616) and the Table of Directory Operations for directory \Finance\Reports (1643).

In addition, other values are updated appropriately, based upon the current state of the partition (1628, 1636, 1637, 1646, 1647, and 1658).

Figure 14:
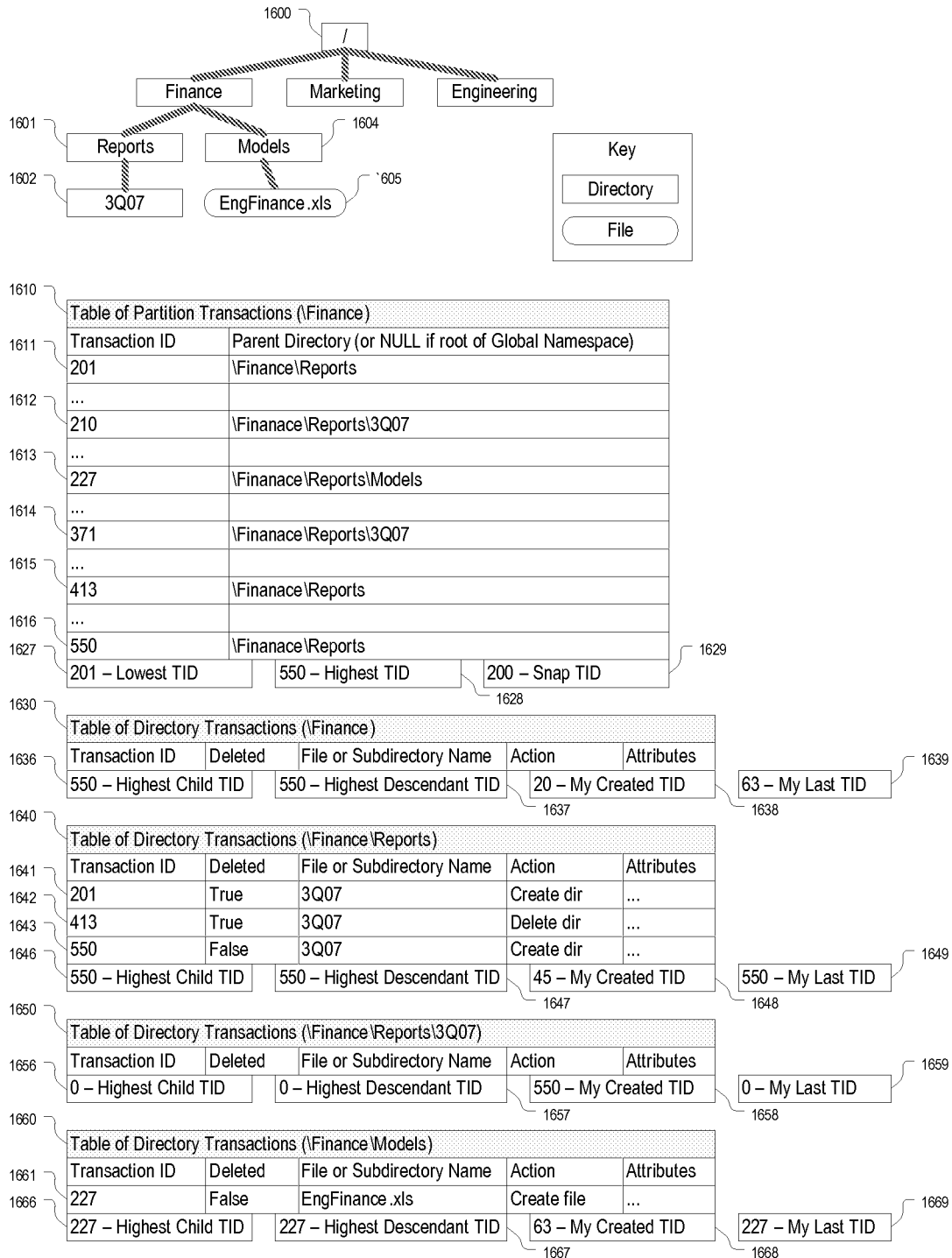
Figure 15:
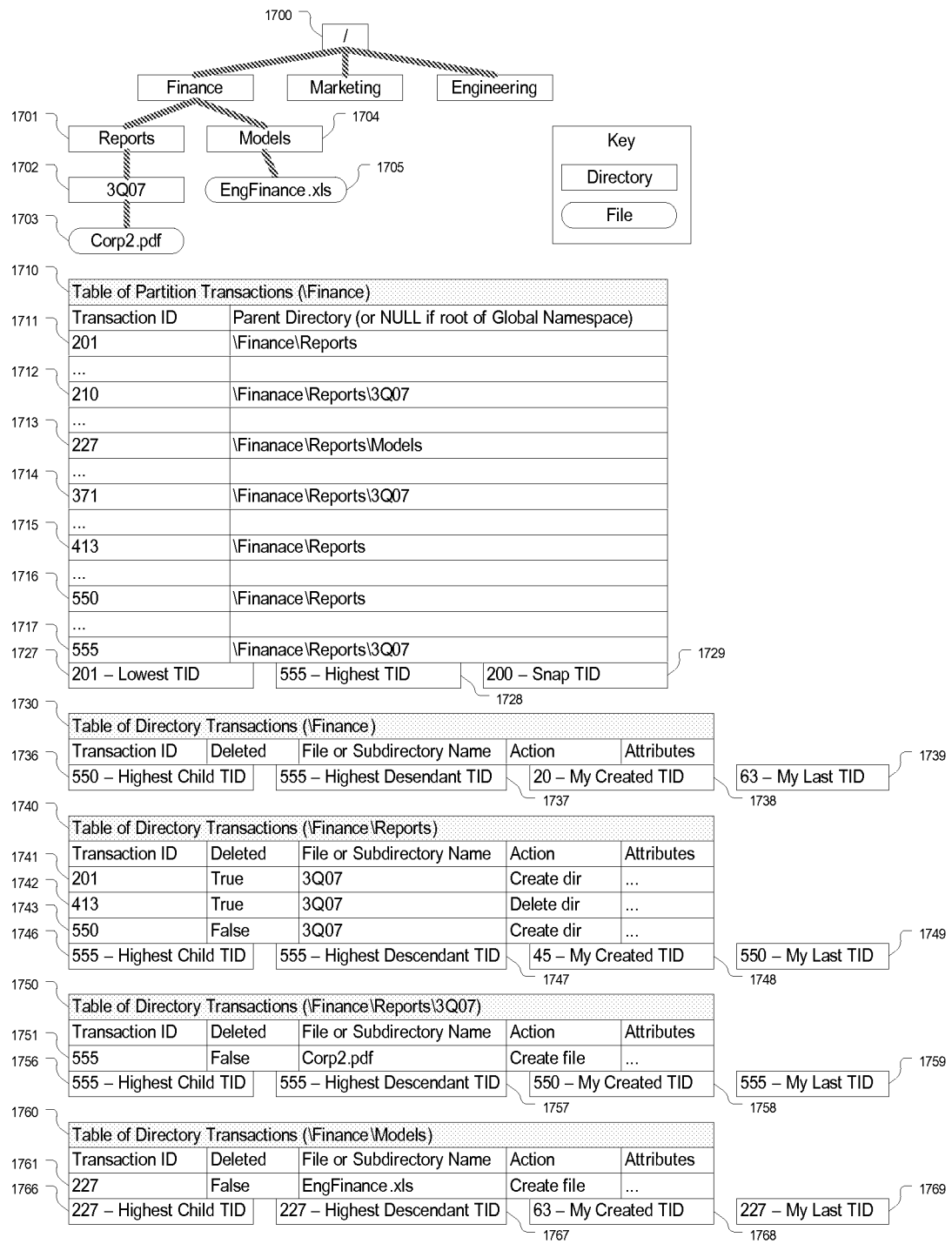

As the final step of this example, the file \Finance\Reports\3Q07\Corp2.pdf (1703) is created in the transition from FIG. 14 to FIG. 15. This results in the Transaction ID 555 being added to the Table of Partition Transactions (1717) as well as the Table of Directory Transactions for \Finance\Reports\3Q07 (1751).

In addition, other entries are updated accordingly, based upon the current state of the partition (1728, 1737, 1746, 1747, 1756, and 1757).

Authoritative Copy Maintained at Remote Site

As discussed above, a mirror server at a remote site may contain the current, past, or both current and past mirror copies of the authoritative copy of files stored at the central site. No particular directory structure is assumed.

In conjunction with the mirror server, the traditional host server at the remote site may be replaced with a Solid State Disk (SSD) or other equally highly reliable storage device at the remote site, which can be accessed directly from the MFM. The SSD or other highly reliable storage device, because of this high reliability, does not require backup and maintains its data even in the event of catastrophic failure. The use of a SSD or other highly reliable storage device can do away with the need for a managed edge server at the remote sites.

Figure 16:
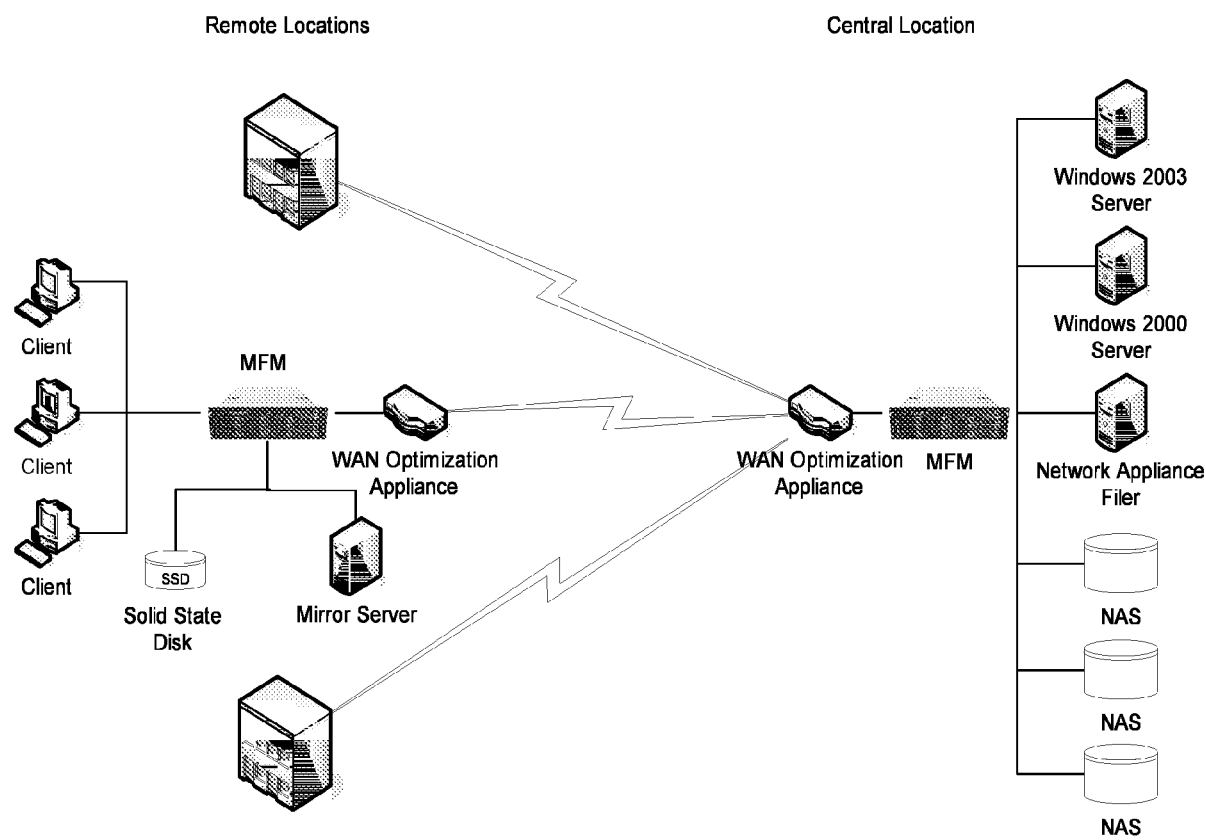

Traditionally, edge servers provide the ability for a remote site to still be able to access and modify data on the edge server, even if the WAN connection is unavailable. Removal of edge servers (by moving the data to the central site) has traditionally meant that the ability for a remote site to access and modify data is unavailable when the WAN connection is unavailable. Certain embodiments remove the need for the managed edge server at the remote site, while still preserving the ability to access and modify data when the WAN is unavailable. An exemplary system is shown in FIG. 16.

As discussed above with reference to FIG. 4, the global namespace is "carved" into non-overlapping virtual partitions such that all of the namespaces contained in each virtual partition are non-overlapping, and the union of all the namespaces contained in each virtual partition is the same as the entire global namespace itself. Thus, each non-overlapping global namespace partition, hereafter referred to as a partition, contains a directory hierarchy consisting of directories, subdirectories, and file objects.

In exemplary embodiments, the authoritative copy of metadata of one or more of the partitions may reside at a remote site. Thus, for example, with reference again to FIG. 4, the Engineering department could be at a remote site, and the metadata for the Engineering partition could have its authoritative copy reside at that remote site.

In addition, the synchronization authority for a partition resides at the site that owns the partitioned namespace and hosts the authoritative copy of the metadata of the partitioned namespace. As discussed above, other sites consult the synchronization authority to determine if their mirror copy of the data or metadata is valid, as well as to request locks.

In exemplary embodiments, when the synchronization authority resides at a remote site, the central site is responsible for synchronizing a partitioned namespace with the remote site that is the synchronization authority of the partitioned namespace. All other remote sites will continue to synchronize the partitioned namespace with the central site. Other than the central site and the remote site that is the synchronization authority of a partitioned namespace, all other remote sites are not aware that the central site is not the synchronization authority of a partitioned namespace.

Thus, in an exemplary embodiment, it is the responsibility of the central site to synchronize its mirror copy of the partitioned namespace with the authoritative copy of the partitioned namespace owned by a remote. The steps to synchronize a common namespace between two sites are described generally above.

Access to files in a partitioned namespace controlled by a remote site from other remotes sites will continue to go through to the central site. Some data read operations may be satisfied by a mirror copy at the central site but most other operations such as locking, writes, or updating attributes will go through two hops. First, the other remote sites send their request to the central site. Then the central site determines if the actual synchronization authority resides at some other remote site, and forwards the request to that remote site that actually owns the authoritative copy of the data or metadata.

In certain embodiments, the SSD or other highly-reliable storage device is used to reliably store the authoritative copy of files that are in the namespace owned by a remote site. However, the metadata of the namespace owned by the remote is stored in the MFM at the remote site. Each file stored in the SSD or other highly-reliable storage device is identified by a 128-bit globally unique file ID. However, generally speaking, not all authoritative copies in the namespace owned by the remote site are in the SSD or other highly-reliable storage device. This is because the SSD or other highly-reliable storage device is generally a relatively expensive device. To allow additional files to be stored in the SSD or other highly-reliable storage device, files in the SSD or other highly-reliable storage device may be purged to reclaim space. Prior to the file being deleted within the SSD or other highly-reliable storage device, the data is copied to the central site. Furthermore, to enable the remote site to operate even if the WAN is unavailable, the data is typically also copied to the mirror server. Only then is the file deleted from the SSD or other highly-reliable storage device.

Before a write operation is allowed to update a file in the partitioned namespace owned by a remote site, the file to be updated must exist in the SSD or other highly-reliable storage device. If the file is not already present in the SSD or other highly-reliable storage device, the file must be copied to the SSD or other highly-reliable storage device from either a mirror copy stored locally at the remote site or from the mirror copy at the central site. Only after a file is stored in the SSD or other highly-reliable storage device is the file allowed to be written at will.

After some period of time (either a timeout, or there is a need to recover space within the SSD or other highly-reliable storage device, or the file is no longer being written), the MFM copies the data to the central site (thus a mirror copy of the data exists at the central site). This allows the central site to backup the data, instead of having to do backup at the remote site.

The SSD or other highly-reliable storage device is unmanaged storage not requiring backup and restore type administration due to its very nature of being highly reliable. All management of the SSD or other highly-reliable storage device (including copying into or out of the SSD or other highly-reliable storage device, or deleting files within the SSD or other highly-reliable storage device) is performed by the MFM.

In an exemplary embodiment, as described above, the mirror server is indexed by sha1 digest values to retrieve file contents. The mirror server continues to be unmanaged storage not requiring backup and restore type administration. Since unmanaged storage is relatively inexpensive, the mirror server at the remote site should be much bigger than the size of the SSD or other highly-reliable storage device. As discussed above, mirror copies may be purged from the mirror server at any time. If purged, data for a given file will always be available in either the SSD or other highly-reliable storage device, or at the central site.

Management of the mirror server (including adding mirror copies and deleting mirror copies to free up space) is performed by the MFM. If the mirror copy of a file purged from the SSD or other highly-reliable storage device is not removed from the mirror server, the file may be brought back into the SSD or other highly-reliable storage device from the mirror server on a subsequent write. If the mirror copy of a file purged from the SSD or other highly-reliable storage device has been removed from the mirror server, then the file's contents would need to be obtained from the central site. With a simple least recently used algorithm for purging data contents from the mirror server together with a huge mirror server, retrieval of the "backup" mirror copy from the central site should generally not be necessary. In addition, a clean up process could be run periodically to remove past mirror copies from the mirror server. Thus, this design allows the remote site to continue to operate on the majority of the local namespace partition even if the WAN link is down.

When a client at a remote site opens a file stored at the remote site, the open request is actually sent to the local MFM. If the authoritative copy of the open file is located at the central site, the steps as depicted in the co-application, Remote File Virutalization Data Mirroring will be followed. Otherwise, the authoritative copy of the open file is located locally. In this latter case, the process to open such a local file is as follows:

Open the file locally. If the open is not successful, an error code is returned. The file handle from opening the file locally is called the local file handle. In an exemplary embodiment, the local file is actually a sparse file and does not contain any data.

If the open of the local file is successful, the local file handle is returned to the user. At the same time, the GUID of the file is retrieved from the metadata. The GUID is used to open the authoritative copy of the file stored in the SSD. If the open file is successful, the returned file handle, the ssd_file_handle, is associated with the local_file_handle.

If the open GUID fails, and the open is for read, then the sha1 digest is retrieved from the metadata and the sha1 digest for the file is then used to obtain a mirror file handle from the mirror server. If a mirror file handle is returned, the mirror file handle is associated with the local_file_handle and the open is done.

Otherwise, the file is marked as not ready. A background process is used to bring a copy of the file from either the mirror server or from the mirror copy located at the central site. The open operation is complete.

When a file request is sent to the MFM, it includes a file handle (the local or the auth file handle). If it is an auth file handle, then the steps described above with reference to remote file virtualization data mirroring will be followed. Otherwise, the steps for handling a file identified by the local file handle are as follows:

If the local_file_handle is marked as not ready, the request will be suspended until the local_file_handle is ready (i.e. the file to be opened is copied into the SSD or other highly-reliable storage device).

If the request is a read operation and if the GUID file handle exists, the GUID file handle is used to retrieve the data. Otherwise, if the GUID file handle does not exist, the mirror handle is used to retrieve the data from the mirror server. The result from either the SSD (or other highly-reliable storage device) or the mirror server is returned to the user.

If the request is a write operation, the GUID file handle is used to write the data to the SSD or other highly-reliable storage device.

If the request is an ioctl call sent from the background copy process informing that the file has been copied into the SSD or other highly-reliable storage device, then the GUID of the file is obtained from the metadata and is used to obtain a GUID file handle from the SSD. After the GUID file handle is obtained, the not ready flag for the file is cleared, and those waiting for the not ready flag to be cleared will be woken up and their operations resumed.

Otherwise, all operations are sent to the MFM and processed locally.

WAN Optimization Appliances

Figure 17:
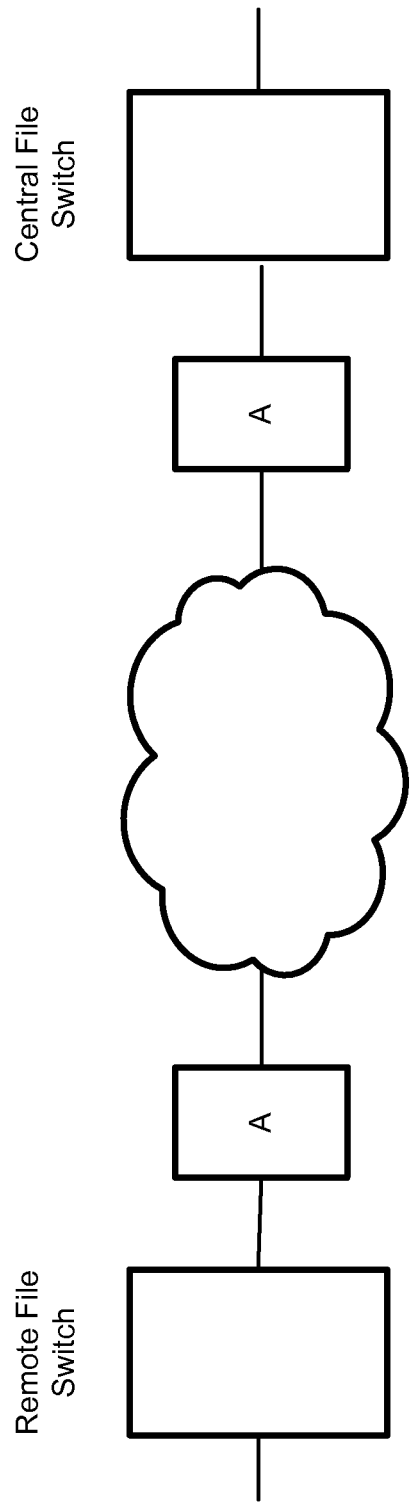
FIG. 17 shows an exemplary switched file system in which WAN Optimization Appliances are interposed between the remote file switch and the central file switch.

As discussed above, WAN Optimization Appliances are sometimes used in WAN environments in order to accelerate remote file access. FIG. 17 shows an exemplary switched file system in which WAN Optimization Appliances (i.e., the two boxes labeled "A") are interposed between the remote file switch and the central file switch. An example of a WAN Optimization Appliance is the STEELHEAD™ appliance sold by Riverbed Technologies Inc., which claims to speed up the TCP traffic between a central site and a remote site to provide 5 to 50 and in some cases 100 times better performance. Such appliances achieve such a performance boost by reducing, if possible, the size of each TCP message sent between the remote and the central site (i.e., a form of data compression) and/or pre-sending messages from a remote site to the central site or vice versa (sometimes referred to herein as "spoofing" or "pre-fetching").

To reduce the size of a message sent, the message is decomposed into a number of variable length fragments. A "fingerprint" is then taken for each fragment. If a receiving site has a fragment that matches the fingerprint of the fragment, that matching fragment will not be sent. The appliances at the central and remote sites are responsible for breaking up a TCP message into fragments and re-assembling it back at the other end of the link. The user application is completely unaware of this.

With spoofing, the appliance predicts (e.g., from peeking at the reply of a CIFS message that responds to a CIFS read message) a set of messages that is likely to be generated by the receiving site after the CIFS read reply message is received. The appliance then creates a set of messages containing additional CIFS read requests on the same file but with different file offsets, and sends these messages immediately back without waiting for the actual requests. The fragments from these reply messages are then kept by the appliances for future use. This technique increases the likelihood that a fragment that is likely to be requested will already be in the appliance and is somewhat analogous to "pre-fetching" techniques used by file systems to increase sequential read performance. For example, if a user reads 16K byte data at offset 0, the file system may immediately issue a read of another 16K byte data at offset 16K, in anticipation that the user will likely issue the next read call during a sequential read operation.

WAN Optimization Appliances of the types just described have certain limitations. For example, while reducing the length of a message between a remote and a central site can certainly speed up the traffic, it would be better to not have to send a message in the first place. The caching/mirroring of metadata and data discussed above with reference to the switched file system shown in FIG. 2 can eliminate some WAN traffic altogether. Also, spoofing in the manner discussed above may not be possible or practical in file systems that employ SMB signing or other client/server authentication mechanisms between the clients and file servers. The main purpose of SMB signing is to prevent injection of CIFS messages between a client and a file server (i.e., to specifically prevent the type of spoofing just described). Currently SMB signing is by default not enabled in a file server. However, if a file server machine is also used as a domain controller, then SMB signing is automatically enabled by default. If SMB signing is enabled for all file servers (which may become the default setting for CIFS file servers), the appliance will not be able to use the above-mentioned message pre-sending technique to boost the performance because it will not be able to generate the proper SMB signings for the spoofed messages.

File Switch with WAN Optimization

Figure 18:
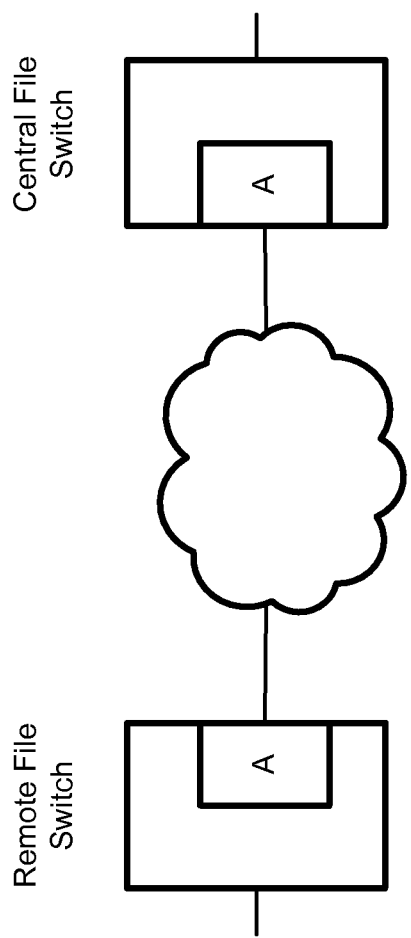
FIG. 18 shows a file switched system having two file switches with WAN optimization functionality in accordance with an exemplary embodiment of the present invention.

In alternative embodiments of the present invention, WAN optimization functionality of the types described above (including data compression and/or spoofing) may be integrated into the MFM devices. FIG. 18 shows a file switched system having two file switches with WAN optimization functionality (represented by the box with letter "A" in each file switch) in accordance with an exemplary embodiment of the present invention. As discussed above, the MFM uses caching/mirroring of both data and metadata in order to eliminate some WAN traffic. When WAN communication is used between two MFMs, the MFMs could employ data compression to reduce the size of WAN messages.

An MFM could also employ pre-fetching in order to pre-fetch data and/or metadata from another MFM or from a file server. It should be noted that, since the MFM already operates as a true client vis-à-vis the file servers, file requests generated by the MFM (including spoofed messages) could be properly SMB signed so as to operate with file servers that require SMB signing.

WAN Optimization Appliance with SMB Signing

Figure 19:
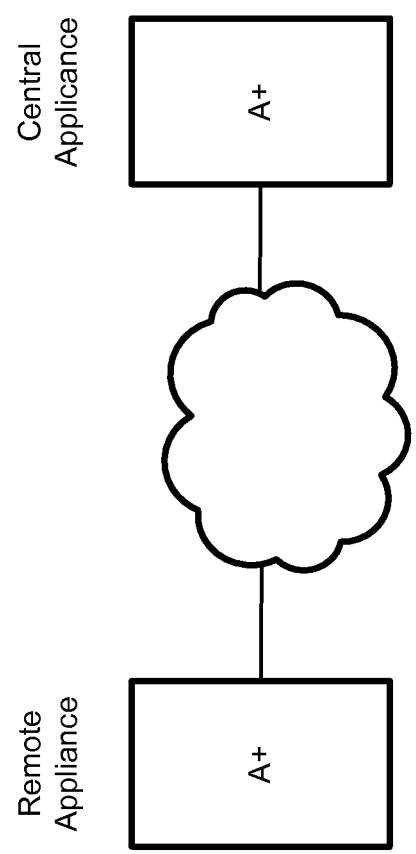
FIG. 19 shows an exemplary system including two WAN Optimization Appliances with SMB signing functionality in accordance with an exemplary embodiment of the present invention.

In additional embodiments of the present invention, some MFM-type functionality (e.g., spoofing with SMB signing) could be incorporated into a WAN Optimization Appliance. FIG. 19 shows an exemplary system including two WAN Optimization Appliances with SMB signing functionality (represented by the two boxes labeled "A+"). Here the appliance would take on the role of a client for communication with the file servers and would implement SMB signing. Messages sent by the appliance to the file servers (including spoofed messages) could then be properly SMB signed. Such appliances could be used with or without MFMs.

Additional WAN Optimization Functionality for Remote File Virtualization

In additional embodiments, the separate appliances shown in FIG. 17 and/or the MFMs with embedded WAN optimization as shown in FIG. 18 could provide a broadcast service for delivering mirror break messages reliably and in priority from the central site to the remote sites.

Additionally, or alternatively, the separate appliances shown in FIG. 17 and/or the MFMs with embedded WAN optimization as shown in FIG. 18 could provide an efficient file transfer service for pre-positioning files from a central site to the remote sites. For example, optimal fingerprints can be obtained from a set of files to be pre-positioned and these fingerprints could be pre-positioned to all remote sites. Also, optimal fingerprints could be obtained from all file objects in the global namespace for fingerprint preloading at remote sites.

It should be noted that terms such as "client" and "server" are used herein to describe various communication devices that may be used in a communication system, and should not be construed to limit the present invention to any particular communication device type. Thus, a communication device may include, without limitation, a bridge, router, bridge-router (brouter), switch, node, server, computer, or other communication device.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the NFM logic is implemented as a set of computer program instructions that is converted into a computer executable form, stored as such in a computer readable medium, and executed by a microprocessor within the NFM under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

It should be noted that the section headings used throughout the detailed description above are for convenience only and do not limit the present invention in any way.

The present invention may be embodied in other specific forms without departing from the true scope of the invention. The described embodiments are to be considered in all respects only as illustrative and not restrictive.

What is claimed is:

1. A central network file manager apparatus comprising:
one or more processors; and
memory coupled to the one or more processors and configured to store an authoritative copy of one or more files selected from at least one of data files or metadata files and wherein the one or more processors are configured to execute program instructions stored in the memory comprising:
communicating mirror copies of each authoritative copy of the one or more files to each of a plurality of remote network file managers;
obtaining updated file data from one of the plurality of remote network file managers when one of the mirror copies is updated by a client at the one remote network file manager;
updating the authoritative copy corresponding to the updated mirror copy with the updated file data;
notifying each of the other remote network file managers that the respective mirror copy stored thereon, and corresponding to the updated mirror copy, is no longer valid; and
asynchronously communicating a mirror copy of the updated authoritative copy to the other remote network file managers using a lazy mirroring technique based on available network bandwidth.

2. An apparatus according to claim 1, wherein the central network file manager and the plurality of remote network file managers maintain a common global namespace.

3. An apparatus according to claim 1, wherein the communicating mirror copies of each authoritative copy program instructions further comprise asynchronously pushing each copy to each remote network file manager using a lazy mirroring technique based on available network bandwidth.

4. An apparatus according to claim 3, wherein the one or more processors are further configured to execute programmed instructions stored in the memory further comprising:
after pushing each mirror copy to each remote network file manager, verifying that the data has not changed since being pushed; and
notifying each remote network file manager that the data is valid.

5. An apparatus according to claim 1, wherein the communicating mirror copies of each authoritative copy program instructions further comprise asynchronous responding, using a lazy mirroring technique based on available network bandwidth, to a pull request for a mirror copy from one or more of the remote network file managers.

6. An apparatus according to claim 5, wherein the one or more processors are further configured to execute programmed instructions stored in the memory further comprising after communicating one or more mirror copies to one or more remote network file managers in response to a pull request, receiving a request, from each of the one or more remote network file managers, to verify that the data is still valid.

7. An apparatus according to claim 1, wherein the one or more processors are further configured to execute programmed instructions stored in the memory further comprising:
maintaining statistics regarding access patterns by remote clients; and
asynchronously communicating a mirror copy of the updated authoritative copy to the other remote network file managers based on the statistics.

8. An apparatus according to claim 1, wherein the authoritative copies are mirrored in at least one of a breadth-first fashion or a depth-first fashion.

9. An apparatus according to claim 1, wherein the communicating mirror copies of each authoritative copy program instructions further comprise asynchronously communicating each copy to each remote network file manager based on at least one of a first access to the authoritative copy by one or more of the remote network file managers, pre-fetching based on one or more authoritative copy access characteristic, and pre-loading of the authoritative copies prior to instantiation of one or more remote network file managers in the network at a remote site.

10. An apparatus according to claim 1 wherein the one or more processors are further configured to execute programmed instructions stored in the memory further comprising communicating with a wide area network (WAN) optimization apparatus that operates as a client to file server nodes, wherein the apparatus implements server message block (SMB) signing on communications with the file server nodes including SMB signing on messages used to pre-fetch data from the file server nodes.

11. A method for managing files, comprising:
storing at a central network file manager, an authoritative copy of one or more files selected from at least one of data files or metadata files;
communicating with the central network file manager mirror copies of each authoritative copy to each of a plurality of remote network file managers;
obtaining at the central network file manager, updated file data from one of the plurality of remote network file managers when one of the mirror copies is updated by a client at the one remote network file manager;
updating at the central network file manager the authoritative copy corresponding to the updated mirror copy with the updated file data;
notifying with the central network file manager each of the other remote network file managers that the respective mirror copy stored thereon, and corresponding to the updated mirror copy, is no longer valid; and
asynchronously communicating with the central network file manager a mirror copy of the updated authoritative copy to the other remote network file managers using a lazy mirroring technique based on available network bandwidth.

12. A method according to claim 11, wherein the central network file manager and the plurality of remote network file managers maintain a common global namespace.

13. A method according to claim 11, wherein the communicating mirror copies of each authoritative copy further comprises asynchronously pushing each copy to each remote network file manager using a lazy mirroring technique based on available network bandwidth.

14. A method according to claim 13, further comprising:
after pushing each mirror copy to each remote network file manager, verifying that the data has not changed since being pushed; and notifying each remote network file manager that the data is valid.

15. A method according to claim 11, wherein the communicating mirror copies of each authoritative copy further comprises asynchronous responding, using a lazy mirroring technique based on available network bandwidth, to a pull request for a mirror copy from one or more of the remote network file managers.

16. A method according to claim 15 further comprising after communicating one or more mirror copies to one or more remote network file managers in response to a pull request, receiving a request, from each of the one or more remote network file managers, to verify that the data is still valid.

17. A method according to claim 11, further comprising:
maintaining statistics with the central file manager apparatus regarding access patterns by remote clients; and
asynchronously communicating with the central file manager apparatus a mirror copy of the updated authoritative copy to the other remote network file managers based on the statistics.

18. A method according to claim 11, wherein the authoritative copies are mirrored in at least one of a breadth-first fashion or a depth-first fashion.

19. A method according to claim 11, wherein the communicating mirror copies of each authoritative copy further comprises asynchronously communicating each copy to each remote network file manager based on at least one of a first access to the authoritative copy by one or more of the remote network file managers, pre-fetching based on one or more authoritative copy access characteristic, and pre-loading of the authoritative copies prior to instantiation of one or more remote network file managers in the network at a remote site.

20. A method according to claim 11, further comprising communicating with the central file manager apparatus with a wide area network (WAN) optimization apparatus that operates as a client to file server nodes, wherein the apparatus implements server message block (SMB) signing on communications with the file server nodes including SMB signing on messages used to pre-fetch data from the file server nodes.

21. A non-transitory computer readable medium having stored thereon instructions for managing files comprising machine executable code which when executed by at least one processor, causes the processor to perform steps comprising:
storing an authoritative copy of one or more files selected from at least one of data files or metadata files;
communicating mirror copies of each authoritative copy to each of a plurality of remote network file managers;
obtaining updated file data from one of the plurality of remote network file managers when one of the mirror copies is updated by a client at the one remote network file manager;
updating the authoritative copy corresponding to the updated mirror copy with the updated file data;
notifying each of the other remote network file managers that the respective mirror copy stored thereon, and corresponding to the updated mirror copy, is no longer valid; and
asynchronously communicating a mirror copy of the updated authoritative copy to the other remote network file managers using a lazy mirroring technique based on available network bandwidth.

22. A medium according to claim 21, wherein the central network file manager and the plurality of remote network file managers maintain a common global namespace.

23. A medium according to claim 22 further having stored thereon instructions that when executed by the processor causes the processor to perform steps further comprising communicating with the central file manager apparatus with a wide area network (WAN) optimization apparatus that operates as a client to file server nodes, wherein the apparatus implements server message block (SMB) signing on communications with the file server nodes including SMB signing on messages used to pre-fetch data from the file server nodes.

24. A medium according to claim 21, wherein the communicating mirror copies of each authoritative copy further comprises asynchronously pushing each copy to each remote network file manager using a lazy mirroring technique based on available network bandwidth.

25. A medium according to claim 24, further having stored thereon instructions that when executed by the processor causes the processor to perform steps further comprising:
after pushing each mirror copy to each remote network file manager, verifying that the data has not changed since being pushed; and
notifying each remote network file manager that the data is valid.

26. A medium according to claim 21, wherein the communicating mirror copies of each authoritative copy further comprises asynchronous responding, using a lazy mirroring technique based on available network bandwidth, to a pull request for a mirror copy from one or more of the remote network file managers.

27. A medium according to claim 26 further having stored thereon instructions that when executed by the processor causes the processor to perform steps further comprising after communicating one or more mirror copies to one or more remote network file managers in response to a pull request, receiving a request, from each of the one or more remote network file managers, to verify that the data is still valid.

28. A medium according to claim 21 further having stored thereon instructions that when executed by the processor causes the processor to perform steps further comprising:
maintaining statistics with the central file manager apparatus regarding access patterns by remote clients; and
asynchronously communicating with the central file manager apparatus a mirror copy of the updated authoritative copy to the other remote network file managers based on the statistics.

29. A medium according to claim 21, wherein the authoritative copies are mirrored in at least one of a breadth-first fashion or a depth-first fashion.

30. A medium according to claim 21, wherein the communicating mirror copies of each authoritative copy further comprises asynchronously communicating each copy to each remote network file manager based on at least one of a first access to the authoritative copy by one or more of the remote network file managers, pre-fetching based on one or more authoritative copy access characteristic, and pre-loading of the authoritative copies prior to instantiation of one or more remote network file managers in the network at a remote site.

* * * * *